(12) United States Patent
Yang

(10) Patent No.: US 10,474,927 B2
(45) Date of Patent: Nov. 12, 2019

(54) ACCELERATED PRECOMPUTATION OF REDUCED DEFORMABLE MODELS

(71) Applicants: STC.UNM, Albuquerque, NM (US); Yin Yang, Albuquerque, NM (US)

(72) Inventor: Yin Yang, Albuquerque, NM (US)

(73) Assignee: STC. UNM, Albuquerque, NM (US)

(*) Notice: Subject to any disclaimer, the term of this patent is extended or adjusted under 35 U.S.C. 154(b) by 27 days.

(21) Appl. No.: 15/757,261

(22) PCT Filed: Sep. 2, 2016

(86) PCT No.: PCT/US2016/050073
§ 371 (c)(1),
(2) Date: Mar. 2, 2018

(87) PCT Pub. No.: WO2017/040905
PCT Pub. Date: Mar. 9, 2017

(65) Prior Publication Data
US 2018/0247158 A1    Aug. 30, 2018

Related U.S. Application Data

(60) Provisional application No. 62/213,760, filed on Sep. 3, 2015.

(51) Int. Cl.
*G06K 9/62* (2006.01)
*G06T 13/20* (2011.01)
(Continued)

(52) U.S. Cl.
CPC .......... *G06K 9/6247* (2013.01); *G06F 17/16* (2013.01); *G06K 9/6214* (2013.01); *G06T 13/20* (2013.01); *G06T 17/20* (2013.01)

(58) Field of Classification Search
CPC ......... G06T 17/00; G06T 19/00; G06T 17/10; G06T 19/20; G06T 15/08; G06T 13/20;
(Continued)

(56) References Cited

U.S. PATENT DOCUMENTS 6,862,374 B1 *  3/2005  Nagai .................... G06T 17/00
                                                    345/419
7,663,648 B1 *  2/2010  Saldanha ............... G06T 17/00
                                                    345/419

(Continued)

FOREIGN PATENT DOCUMENTS

WO        2017040905 A1    3/2017

OTHER PUBLICATIONS

Kim et al., Skipping Steps in Deformable Simulation with Online Model Reduction, 2009 (Year: 2009).*

(Continued)

*Primary Examiner* — Devona E Faulk
*Assistant Examiner* — Charles L Beard
(74) *Attorney, Agent, or Firm* — Keith Vogt, Ltd.; Keith A. Vogt

(57) ABSTRACT

Technologies are disclosed for precomputation of reduced deformable models. In such precomputation, a Krylov subspace iteration may be used to construct a series of inertia modes for an input mesh. The inertia modes may be condensed into a mode matrix. A set of cubature points may be sampled from the input mesh, and cubature weights of the set of cubature points may be calculated for each of the inertia modes in the mode matrix. A training dataset may be generated by iteratively adding training samples to the training dataset until a training error metric converges, wherein each training sample is generated from an inertia mode in the mode matrix and corresponding cubature weights. The reduced deformable model may be generated, including inertia modes in the training dataset and corresponding cubature weights.

14 Claims, 17 Drawing Sheets

(51) Int. Cl.
  *G06T 17/20* (2006.01)
  *G06F 17/16* (2006.01)
(58) Field of Classification Search
  CPC .... G06T 17/20; G06K 9/6247; G06K 9/6214;
  G06F 17/16
  See application file for complete search history.

(56) References Cited

U.S. PATENT DOCUMENTS

| | | | | |
|---|---|---|---|---|
| 8,924,186 B1* | 12/2014 | Zhao | G06F 17/5095 | 703/13 |
| 9,063,882 B1* | 6/2015 | Zhao | G06F 17/12 | |
| 9,378,589 B2* | 6/2016 | Kim | G06T 19/00 | |
| 9,601,109 B2* | 3/2017 | Horesh | G10L 15/063 | |
| 2002/0024517 A1* | 2/2002 | Yamaguchi | A63F 13/10 | 345/424 |
| 2002/0130853 A1* | 9/2002 | Horowitz | G06T 13/40 | 345/420 |
| 2003/0184603 A1* | 10/2003 | Marshall | G06T 13/20 | 345/473 |
| 2005/0128211 A1* | 6/2005 | Berger | G06T 19/00 | 345/582 |
| 2006/0028466 A1* | 2/2006 | Zhou | G06T 17/20 | 345/420 |
| 2006/0071932 A1* | 4/2006 | Weese | G06T 15/08 | 345/424 |
| 2006/0122999 A1* | 6/2006 | Sosnov | G06F 16/5854 | |
| 2006/0139347 A1* | 6/2006 | Choi | G06F 17/5018 | 345/419 |
| 2008/0180448 A1* | 7/2008 | Anguelov | G06T 13/40 | 345/475 |
| 2008/0309664 A1* | 12/2008 | Zhou | G06T 13/40 | 345/420 |
| 2009/0002376 A1* | 1/2009 | Xu | G06T 13/40 | 345/473 |
| 2009/0284529 A1* | 11/2009 | De Aguiar | G06T 13/40 | 345/420 |
| 2010/0020073 A1* | 1/2010 | Corazza | G06T 13/40 | 345/420 |
| 2010/0053186 A1* | 3/2010 | DeRose | G06T 19/00 | 345/581 |
| 2010/0111370 A1* | 5/2010 | Black | G06K 9/00369 | 382/111 |
| 2011/0275921 A1* | 11/2011 | Revishvili | A61B 5/04023 | 600/382 |
| 2011/0296331 A1* | 12/2011 | Iyer | A41H 5/00 | 715/771 |
| 2011/0305379 A1* | 12/2011 | Mahfouz | A61F 2/3094 | 382/131 |
| 2012/0035459 A1* | 2/2012 | Revishvili | A61B 5/0402 | 600/411 |
| 2012/0081357 A1* | 4/2012 | Habbecke | G06T 17/00 | 345/419 |
| 2012/0162217 A1* | 6/2012 | Lim | G06T 15/205 | 345/419 |
| 2012/0221617 A1* | 8/2012 | Subbarao | G06F 17/13 | 708/404 |
| 2012/0281019 A1* | 11/2012 | Tamstorf | G06T 3/0093 | 345/646 |
| 2012/0281873 A1* | 11/2012 | Brown | G06T 19/006 | 382/103 |
| 2012/0290976 A1* | 11/2012 | Lahm | G06T 19/00 | 715/810 |
| 2013/0162633 A1* | 6/2013 | Berger | G06T 15/04 | 345/419 |
| 2013/0187919 A1* | 7/2013 | Medioni | G06T 17/00 | 345/420 |
| 2013/0271449 A1* | 10/2013 | Lee | G06T 15/08 | 345/419 |
| 2013/0286012 A1* | 10/2013 | Medioni | G06T 17/00 | 345/420 |
| 2014/0015852 A1* | 1/2014 | Kantartzis | G06T 11/006 | 345/619 |
| 2014/0028673 A1* | 1/2014 | Gregson | G06T 17/20 | 345/420 |
| 2014/0043328 A1* | 2/2014 | Chen | G06T 17/00 | 345/419 |
| 2014/0092090 A1* | 4/2014 | Fleury | G06T 15/503 | 345/420 |
| 2014/0198107 A1* | 7/2014 | Thomaszewski | G06T 13/40 | 345/473 |
| 2014/0198108 A1* | 7/2014 | Sigal | G06T 13/40 | 345/474 |
| 2014/0333614 A1* | 11/2014 | Black | G06F 17/5009 | 345/419 |
| 2015/0074158 A1* | 3/2015 | Kimmel | G06K 9/00214 | 708/270 |
| 2015/0088225 A1* | 3/2015 | Noble | A61N 1/0541 | 607/57 |
| 2015/0088473 A1* | 3/2015 | Liu | G06F 17/5009 | 703/2 |
| 2015/0161987 A1* | 6/2015 | Horesh | G10L 15/063 | 704/232 |
| 2015/0206341 A1* | 7/2015 | Loper | G06T 17/10 | 345/420 |
| 2015/0213646 A1* | 7/2015 | Ma | G06T 17/20 | 345/420 |
| 2015/0317808 A1* | 11/2015 | Tian | G06T 11/206 | 345/440 |
| 2016/0048618 A1* | 2/2016 | Shimizu | G06F 17/5018 | 703/2 |
| 2016/0140255 A1* | 5/2016 | Kim | G06F 17/5018 | 703/1 |
| 2016/0202389 A1* | 7/2016 | Malvesin | G06F 17/16 | 703/2 |
| 2017/0004621 A1* | 1/2017 | Maranzana | G06T 17/50 | |
| 2017/0018118 A1* | 1/2017 | Li | G06F 17/5018 | |
| 2017/0032055 A1* | 2/2017 | Eisemann | G06T 17/10 | |
| 2017/0032579 A1* | 2/2017 | Eisemann | G06T 13/40 | |
| 2017/0061683 A1* | 3/2017 | Dorin | G06T 17/00 | |
| 2017/0118011 A1* | 4/2017 | Shibutani | H04L 9/0625 | |
| 2017/0147874 A1* | 5/2017 | Perbet | G06K 9/00201 | |
| 2017/0193692 A1* | 7/2017 | Huang | G06T 5/002 | |
| 2017/0213381 A1* | 7/2017 | Bronstein | G06N 3/08 | |
| 2017/0221274 A1* | 8/2017 | Chen | G06T 15/005 | |
| 2017/0320346 A1* | 11/2017 | Zhou | B41M 1/40 | |
| 2017/0330375 A1* | 11/2017 | Chen | G06T 17/00 | |
| 2017/0337732 A1* | 11/2017 | Tamersoy | G06K 9/00369 | |
| 2017/0351793 A1* | 12/2017 | Tamstorf | G06F 17/5018 | |
| 2018/0061141 A1* | 3/2018 | Choi | G06T 19/20 | |
| 2018/0130245 A1* | 5/2018 | Kozlov | G06T 13/40 | |
| 2018/0130256 A1* | 5/2018 | Wampler | G06T 13/20 | |
| 2018/0144533 A1* | 5/2018 | Brossard | G06T 13/40 | |
| 2018/0165860 A1* | 6/2018 | Noh | G06F 3/0488 | |
| 2018/0181802 A1* | 6/2018 | Chen | G06K 9/00201 | |
| 2018/0210413 A1* | 7/2018 | Frangos | G06F 17/18 | |
| 2018/0315230 A1* | 11/2018 | Black | G06T 13/40 | |
| 2018/0321347 A1* | 11/2018 | Wang | G01R 33/5608 | |
| 2019/0012831 A1* | 1/2019 | Mitchell | G06F 17/50 | |
| 2019/0019331 A1* | 1/2019 | Alliez | G06F 17/17 | |
| 2019/0087979 A1* | 3/2019 | Mammou | G06T 9/001 | |
| 2019/0096116 A1* | 3/2019 | Cheong | G06T 15/02 | |
| 2019/0096127 A1* | 3/2019 | Huang | G06T 17/005 | |
| 2019/0108300 A1* | 4/2019 | Soler Arasanz | G06F 17/5018 | |
| 2019/0108396 A1* | 4/2019 | Dal Mutto | G06K 9/00664 | |

OTHER PUBLICATIONS

Kim et al. Physics-based Character Skinning using Multi-Domain Subspace Deformations, 2011 (Year: 2011).*
Pernice et al., NITSOL: A Newton Iterative Solver for Nonlinear Systems, 1998 (Year: 1998).*
Xu, H., Li, Y., Chen, Y., and Barbic, J. 2015. Interactive Material Design Using Model Reduction. ACM Trans. on Graphics 34, 2, 14 pages.
Yang, Y., Xu, W., Guo, X., Zhou, K., and Guo, B. 2013. Boundary-aware multidomain subspace deformation. IEEE Transactions on Visualization and Computer Graphics 19, 10, 1633-1645.

(56) References Cited

OTHER PUBLICATIONS

Zheng, C., and James, D. L. 2011. Toward high-quality modal contact sound. ACM Transactions on Graphics (Proceedings of SIGGRAPH 2011) 30, 4 (Aug.).

Zou, H., Hastie, T., and Tibshirani, R. 2006. Sparse Principal Component Analysis. Journal of Computational and Graphical Statistics, vol. 15, No. 2, pp. 265-286.

Alanelli, M., and Hadjidimos, A. 2004. Block gauss elimination followed by a classical iterative method for the solution of linear systems. Journal of Computational and Applied Mathematics 163, 2, 381-400.

An, S. S., Kim, T., and James, D. L. 2008. Optimizing cubature for efficient integration of subspace deformations. ACM Trans. Graph. 27, 5 (Dec.), 165:1-165:10.

Atkinson, K. 1989. An Introduction to Numerical Analysis, 2 edition ed. Wiley, New York, Jan.

Baraff, D., and Witkin, A. 1992. Dynamic simulation of non-penetrating flexible bodies. SIGGRAPH Comput. Graph. 26, 2 (July), 303-308.

Barbic, J., and James, D. L. 2005. Real-time subspace integration for st. venant-kirchhoff deformable models. In ACM SIGGRAPH 2005 Papers, ACM, SIGGRAPH '05, 982-990.

Barbic, J., and James, D. L. 2010. Subspace self-collision culling. ACM Trans. Graph. 29, 4 (July), 81:1-81:9.

Barbic, J., and Popovic, J. 2008. Real-time control of physically based simulations using gentle forces. ACM Trans. on Graphics (SIGGRAPH Asia 2008) 27, 5, 163:1-163:10.

Barbic, J., and Zhao, Y. 2011. Real-time large-deformation substructuring. In ACM SIGGRAPH 2011 Papers, SIGGRAPH '11, 91:1-91:8.

Barbic, J., Da Silva, M., and Popovi'c, J. 2009. Deformable object animation using reduced optimal control. ACM Trans. Graph. 28, 3, 53:1-53:9.

Barbic, J., Sin, F., and Grinspun, E. 2012. Interactive editing of deformable simulations. ACM Trans. Graph. 31, 4 (July), 70:1-70:8.

Berrut, J.-P., and Trefethen, L. N. 2004. Barycentric lagrange interpolation. SIAM Review 46, 3, 501-517.

Bingham, E., and Mannila, H. 2001. Random projection in dimensionality reduction: Applications to image and text data. KDD '01, 245-250.

Bonet, D. J., and Wood, D. R. D. 2008. Nonlinear Continuum Mechanics for Finite Element Analysis. Cambridge University Press.

Brown, P., and Saad, Y. 1990. Hybrid krylov methods for nonlinear systems of equations. SIAM Journal on Scientific and Statistical Computing 11, 3, 450-481.

Capell, S., Green, S., Curless, B., Duchamp, T., and Popovi'c, Z. 2002. Interactive skeleton-driven dynamic deformations. SIGGRAPH '02, 586-593.

Capell, S., Green, S., Curless, B., Duchamp, T., and Popovi'c, Z. 2002. A multiresolution framework for dynamic deformations. In Proceedings of the 2002 ACM SIGGRAPH/Eurographics Symposium on Computer Animation, SCA '02, 41-47.

Chan, T., and Jackson, K. 1984. Nonlinearly preconditioned krylov subspace methods for discrete newton algorithms. SIAM Journal on Scientific and Statistical Computing 5, 3, 533-542.

Choi, M. G., and Ko, H.-S. 2005. Modal warping: Real-time simulation of large rotational deformation and manipulation. IEEE Transactions on Visualization and Computer Graphics 11, 1 (Jan.), 91-101.

Dasgupta, S. 2000. Experiments with random projection. In Proceedings of the 16th Conference on Uncertainty in Artificial Intelligence, UAI '00, 143-151.

García, F. G., Paradinas, T., Coll, N., and Patow, G. 2013. *cages:: A multilevel, multi-cage-based system for mesh deformation. ACM Trans. Graph. 32, 3 (July), 24:1-24:13.

Golub, G. H., and Van Van Loan, C. F. 1996. Matrix Computations (Johns Hopkins Studies in Mathematical Sciences)(3rd Edition). Johns Hopkins University Press.

Grinspun, E., Krysl, P., and Schröder, P. 2002. Charms: A simple framework for adaptive simulation. SIGGRAPH '02, 281-290.

Harmon, D., and Zorin, D. 2013. Subspace integration with local deformations. ACM Trans. Graph. 32, 4 (July), 107:1-107:10.

Hauser, K. K., Shen, C., and O'Brien, J. F. 2003. Interactive deformation using modal analysis with constraints. In Graphics Interface, CIPS, Canadian Human-Computer Commnication Society, 247-256.

Hecht, F., Lee, Y. J., Shewchuk, J. R., and O'Brien, J. F. 2012. Updated sparse cholesky factors for corotational elastodynamics. ACM Trans. Graph. 31, 5 (Sept.), 123:1-123:13.

Huang, J., Tong, Y., Zhou, K., Bao, H., and Desbrun, M. 2011. Interactive shape interpolation through controllable dynamic deformation. Visualization and Computer Graphics, IEEE Transactions on 17, 7 (July), 983-992.

Hughes, T. J. R. 2000. The Finite Element Method: Linear Static and Dynamic Finite Element Analysis (Dover Civil and Mechanical Engineering). Dover Publications.

James, D. L., and Pai, D. K. 2004. Bd-tree: Output-sensitive collision detection for reduced deformable models. SIGGRAPH '04, 393-398.

Kavan, L., Sloan, P.-P., and O'Sullivan, C. 2010. Fast and efficient skinning of animated meshes. Computer Graphics Forum 29, 2, 327-336.

Kharevych, L., Mullen, P., Owhadi, H., and Desbrun, M. 2009. Numerical coarsening of inhomogeneous elastic materials. ACM Trans. Graph. 28, 3 (July), 51:1-51:8.

Kim, T., and James, D. L. 2009. Skipping steps in deformable simulation with online model reduction. ACM Trans. Graph. 28, 5 (Dec.), 123:1-123:9.

Kim, T., and James, D. L. 2011. Physics-based character skinning using multi-domain subspace deformations. SCA 11, 63-72.

Koh, W., Narain, R., and O'Brien, J. F. 2014. View-dependent adaptive cloth simulation. In Proceedings of the ACM SIGGRAPH/Eurographics Symposium on Computer Animation, 1-8.

Kry, P. G., James, D. L., and Pai, D. K. 2002. Eigenskin: Real time large deformation character skinning in hardware. SCA '02, 153-159.

Meyer, M., and Anderson, J. 2007. Key point subspace acceleration and soft caching. In ACM SIGGRAPH 2007 Papers, SIGGRAPH '07.

Miller, K. S. 1981. On the inverse of the sum of matrices. Mathematics Magazine 54, 2, pp. 67-72.

Müller, M., Dorsey, J., McMillan, L., Jagnow, R., and Cutler, B. 2002. Stable real-time deformations. SCA '02, 49-54.

Nealen, A., MâcÂijller, M., Keiser, R., Boxerman, E., and Carlson, M. 2006. Physically based deformable models in computer graphics. Computer Graphics Forum 25, 4, 809-836.

Nesme, M., Kry, P. G., Je`rábková, L., and Faure, F. 2009. Preserving topology and elasticity for embedded deformable models. SIGGRAPH '09, 52:1-52:9.

Parlett, B. N. 1987. The Symmetric Eigenvalue Problem (Classics in Applied Mathematics). Society for Industrial and Applied Mathematics.

Pentland, A., and Williams, J. 1989. Good vibrations: Modal dynamics for graphics and animation. SIGGRAPH '89, 215-222.

Pernice, M., and Walker, H. 1998. Nitsol: A newton iterative solver for nonlinear systems. SIAM Journal on Scientific Computing 19, 1, 302-318.

Saad, Y. 1981. Krylov subspace methods for solving large unsymmetric linear systems. Mathematics of Computation 37, 155, pp. 105-126.

Shabana, A. A. 2005. Dynamics of Multibody Systems, third ed. Cambridge University Press. Cambridge Books Online.

Shewchuk, J. R. 1994. An introduction to the conjugate gradient method without the agonizing pain. Tech. rep., Pittsburgh, PA, USA.

Teng, Y., Otaduy, M. A., and Kim, T. 2014. Simulating articulated subspace self-contact. ACM Trans. Graph. 33, 4 (July), 106:1-106:9.

Terzopoulos, D., Platt, J., Barr, A., and Fleischer, K. 1987. Elastically deformable models. SIGGRAPH Comput. Graph. 21, 4 (Aug.), 205-214.

Von Tycowicz, C., Schulz, C., Seidel, H.-P., and Hildebrandt, K. 2013. An efficient construction of reduced deformable objects. ACM Trans. Graph. 32, 6 (Nov.), 213:1-213:10.

(56) References Cited

OTHER PUBLICATIONS

International Search Report and Written Opinion for PCT/US2016/050073, International Searching Authority, dated Nov. 3, 2016.
Mitchell, N. et al., GRIDiron: An interactive authoring and cognitive training foundation for reconstructive plastic surgery procedures, Jul. 2015.

* cited by examiner

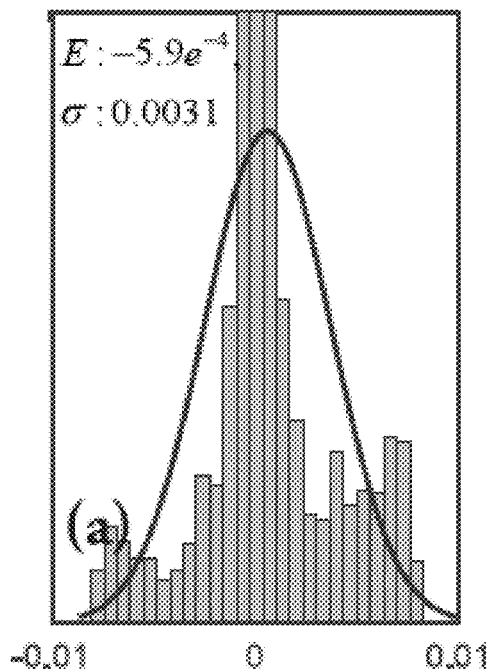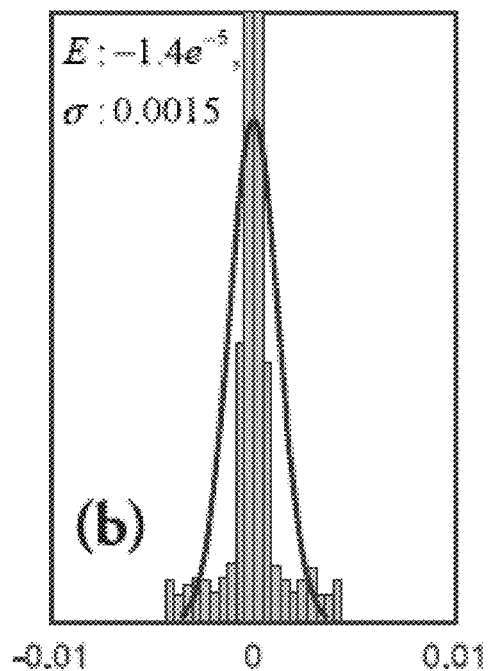
FIG. 7A  FIG. 7B
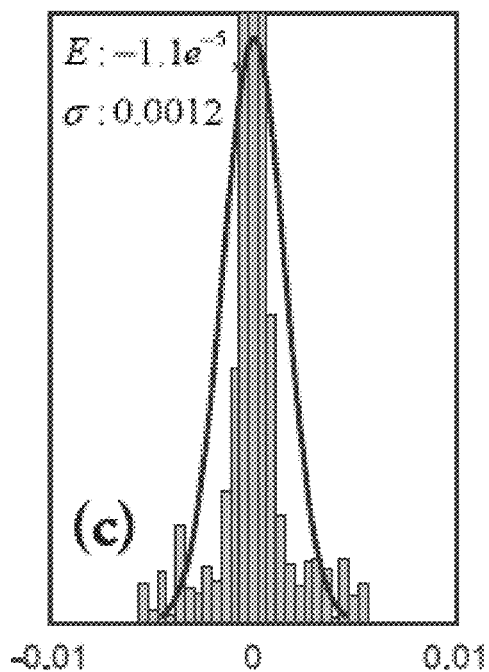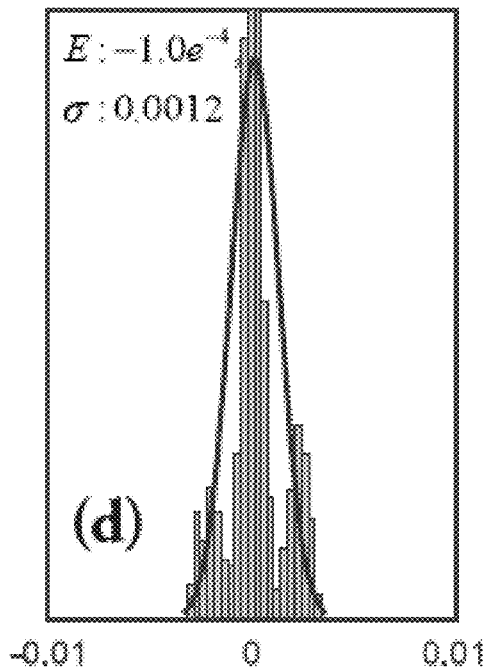
FIG. 7C  FIG. 7D

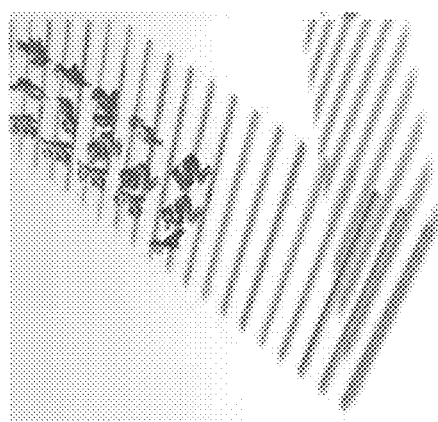
FIG. 16A
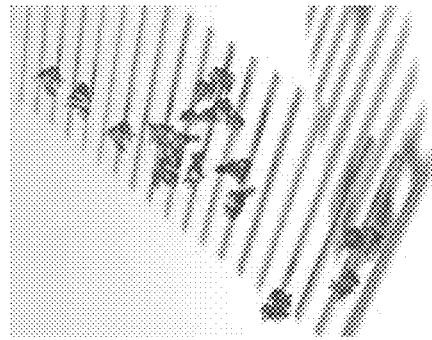
FIG. 16B
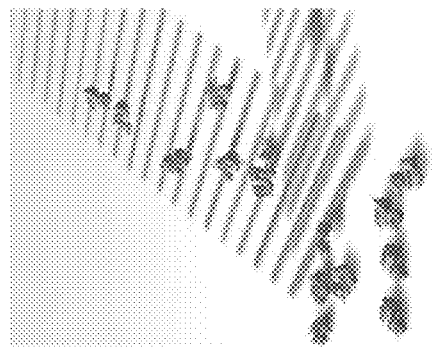
FIG. 16C
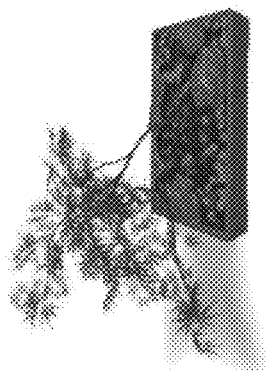
FIG. 17A
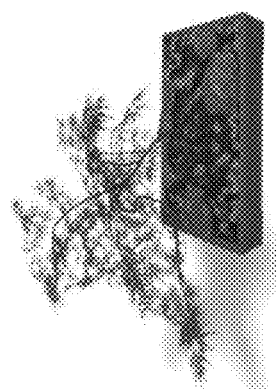
FIG. 17B
FIG. 17C
FIG. 17D

US 10,474,927 B2

ACCELERATED PRECOMPUTATION OF REDUCED DEFORMABLE MODELS

CROSS REFERENCE TO RELATED APPLICATIONS

Priority is claimed to U.S. Provisional Application No. 62/213,760, filed on Sep. 3, 2015, entitled "Expediting Precomputation for Reduced Deformable Simulation." The prior application is incorporated by reference in its entirety.

STATEMENT OF GOVERNMENT SUPPORT

This invention was made with Government support under Agreement CRII-1464306 awarded by the National Science Foundation. The Government has certain rights in this invention.

BACKGROUND

Physics based animation generally facilitates producing realistic video animations wherein objects, particularly soft objects, deform in response to forces. The computation of object deformation, especially for complex objects such as trees, animals, and people, can be time consuming. Therefore, approaches to accelerate such computations are of interest in the field.

Model reduction methods can substantially accelerate deformable simulations and have become popular in many computer graphics applications, ranging from animation generation and control, material design, to realistic sound synthesis. In these methods, a small number of deformation basis vectors or modes are computed beforehand. The online simulation then constrains the deformation to a subspace spanned by the modes, tremendously reducing the simulation degrees of freedom. While enjoying fast simulation performance, model reduction methods need to carefully construct a set of modes that well express possible deformations during the simulation. This is usually an expensive task that can take hours to obtain plausible modes.

The conventional wisdom here is to tax the preprocessing step in exchange for runtime performance. Indeed, if the object geometry and material properties have been decided, it is worthwhile and affordable to precompute once for repeated online simulations. However, when the shape or material is frequently altered—for instance, in the case where a user is exploring different animation settings, a long precomputation time would drastically slow down the work flow because every geometric and material update dictates a re-computation of the reduced model. There is a need in the art to accelerate precomputation in a typical reduced deformable simulation pipeline, a problem that has been largely overlooked.

SUMMARY

Methods, devices, and computer readable media are disclosed to precompute reduced deformable models for objects, e.g., objects which may be represented graphically by input meshes. Some example methods may include applying a Krylov subspace iteration to construct a series of inertia modes for the input mesh; condensing the inertia modes into a mode matrix; sampling a set of cubature points from the input mesh, and calculating cubature weights of the set of cubature points for each of the inertia modes in the mode matrix; generating a training dataset by iteratively adding training samples to the training dataset until a training error metric converges, wherein each training sample is generated from an inertia mode in the mode matrix and corresponding cubature weights; and generating the reduced deformable model, wherein the reduced deformable model includes inertia modes in the training dataset and corresponding cubature weights.

Example computing devices according to this disclosure may generally comprise a processor and memory including computer readable instructions to perform the methods disclosed herein. Computer readable media may according to this disclosure may generally comprise computer readable instructions to perform the methods disclosed herein. Further aspects and embodiments are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein:

FIGS. 7A, 7B, 7C, and 7D provide example statistics of modal pair orthogonality.

FIGS. 16A, 16B, and 16C illustrate a series of snapshots from a free-floating deformable simulation using unconstrained nonlinear modes.

FIGS. 17A, 17B, 17C, and 17D illustrate animation snapshots of a maple tree model, in an example multi-domain simulation with high-order nonlinear modes.

DETAILED DESCRIPTION

Figure 1:
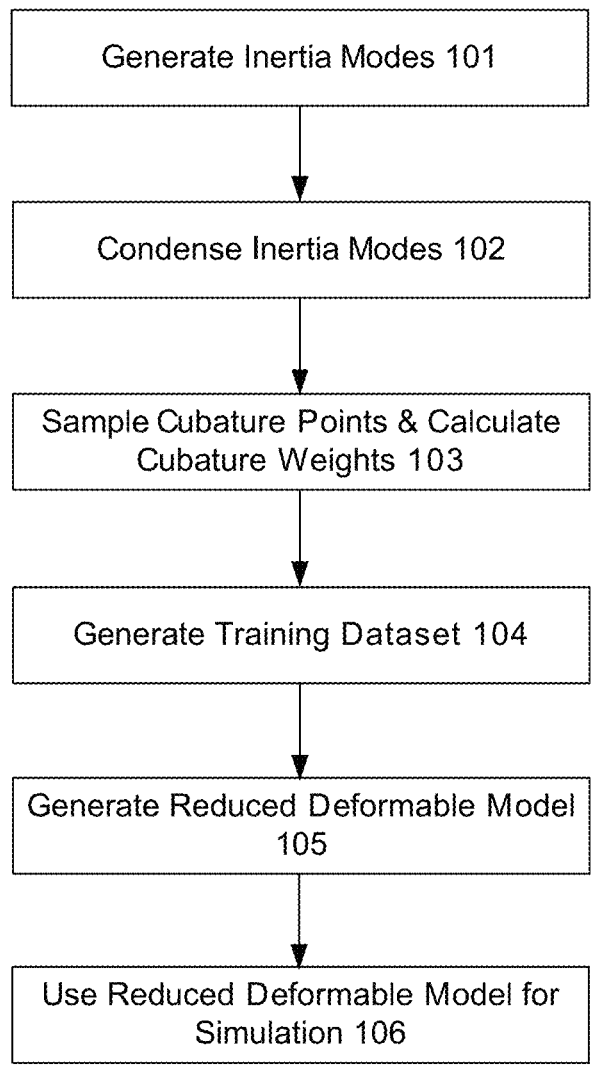
FIG. 1 illustrates an example method to precompute a reduced deformable model for an object represented by an input mesh.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

FIG. 1 illustrates an example method to precompute a reduced deformable model for an object represented by an input mesh, according to at least some embodiments of this disclosure. The operations of FIG. 1 may be carried out by a computing device, e.g., the example computing device illustrated in FIG. 21. The operations of FIG. 1 may therefore optionally be embodied as instructions on a computer readable medium as will be appreciated. The following description begins with a general summary of FIG. 1, followed by a detailed discussion, which refers to FIGS. 2-21. It should be noted that operations illustrated in FIG. 1 may potentially be omitted, modified, and/or re-ordered in some embodiments.

At a "Generate Inertia Modes" operation 101, in some embodiments, a Krylov subspace iteration may be applied to construct a series of inertia modes for a given input mesh. The series of inertia modes may comprise linear inertia modes and nonlinear inertia modes. Linear inertia modes may result from the Krylov subspace iteration. Nonlinear inertia modes may be generated by computing asymptotic inertia derivatives for the input mesh, as described in detail herein. Also, in some embodiments, a Gram-Schmidt orthogonalization scheme may be applied to regularize the constructed series of inertia modes, as described in detail herein.

At a "Condense Inertia Modes" operation 102, in some embodiments, the inertia modes generated at operation 101 may be condensed into a mode matrix. For example, a random projection method may be used to condense the inertia modes in the mode matrix, as described in detail herein.

At a "Sample Cubature Points and Calculate Cubature Weights" operation 103, in some embodiments, a set of cubature points may be sampled from the input mesh, and cubature weights may be calculated for the set of cubature points, for each of the linear inertia modes in the mode matrix. In some embodiments, the set of cubature points may be uniformly sampled from the input mesh, as described in detail herein.

At a "Generate Training Dataset" operation 104, in some embodiments, a training dataset may be generated by iteratively adding training samples to the training dataset until a training error metric converges, wherein each training sample is generated from an inertia mode in the mode matrix and corresponding cubature weights. Iteratively adding training samples to the training dataset may comprise adding more than one inertia mode at each iteration, as described in detail herein.

At a "Generate Reduced Deformable Model" operation 105, in some embodiments, a reduced deformable model may be generated and/or may be embodied by the completed training dataset. The reduced deformable model may include inertia modes in the training dataset and corresponding cubature weights.

At a "Use Reduced Deformable Model for Simulation" operation 106, in some embodiments, the reduced deformable model generated by operations 101-105 may be used to generate simulations of the object represented by the input mesh. For example, the reduced deformable model may be used in one or more online simulations.

1 INTRODUCTION

This disclosure generally provides technologies to accelerate the precomputation step in a reduced deformable simulation pipeline. The standard precomputation in a typical reduced model method undergoes three expensive sub-steps. First, the reduced modes are typically extracted using the modal analysis or principle component analysis (PCA) methods, both of which rely on a generalized Eigen analysis or singular value decomposition. For a high-resolution finite element mesh, this is costly. Secondly, when used in a nonlinear deformable simulation, model reduction methods need to evaluate the object's nonlinear internal forces at runtime. Such runtime evaluations are accelerated using a cubature scheme, but the precomputation of the cubature points and their weights is known to be computationally expensive. Lastly, to facilitate the cubature training, one also needs to prepare for a set of training poses and simulate them using a full-space simulation, which is typically expensive. In addition, there is always a question of what kind of training poses to be included in the training dataset. Too few training poses lead to unsatisfactory subspace construction, while too many poses unnecessarily increase the cost for data preparation.

As a response to the aforementioned challenges, we offer three techniques to accelerate these precomputation sub-steps: First, for modal construction, we augment the linear inertia mode technique originally designed for substructured objects. This method (§ 4), based on Krylov iterations, allows us to sidestep the expensive Eigen decomposition in traditional modal construction methods. We devise a reduced Gram-Schmidt orthogonalization scheme to quickly regularize the modal vectors, and derive a formula to compute nonlinear reduced modes up to an arbitrary order. Furthermore, to extract a compact set of modes, we propose a random projection algorithm inspired by techniques in the field of data mining. As a result, our method at this sub-step may in some embodiments achieve results 20-40× faster than standard modal analysis-based methods.

Second, we accelerate the precomputation of cubature points and weights. Based on the Newton-Cotes rule, our cubature points may be sampled uniformly in the solid body, but the cubature weights may be trained individually and in parallel across all reduced modes. As a result, some embodiments of this disclosure can potentially finish cubature training within milliseconds.

Third, our new cubature training scheme further allows us to answer the question of how to effectively prepare training samples. We interpret the training process as a Monte Carlo integration for finding the expected error of the reduced simulation. From this point of view, we disclose an algorithm to incrementally add training samples and stop when no more samples are needed. As a result, it saves us from generating unnecessary training samples and ultimately reduces the precomputation cost.

Putting together all these techniques, we significantly accelerate the precomputation step. Compared to the standard pipeline, some embodiments may gain orders-of-magnitude speedups in preprocessing while retaining the runtime simulation quality comparable to the standard methods. Furthermore, the disclosed methods are independent from any particular online reduced simulation methods, so the disclosed methods can work in tandem with different types of simulators, including simulators for single-body and substructured deformable simulation as well as sound simulation.

2 RELATED WORK

The Finite Element Method (FEM) based framework has become one of the primary numerical tools to handle elastic deformable objects. The governing differential equilibrium equations across the deformable body are numerically solved with the discretization of many interconnected small elements yielding realistic results. Various material properties can also be accommodated in this framework based on well-established theories from continuum mechanics.

High computational cost is a major drawback associated with FEM, especially for meshes of large size. In order to make deformable models more efficient for interactive applications, numerous contributions have been proposed in the decades. Multi-resolution and adaptive simulations use hierarchical spatial discretization of the simulation domain to accelerate the computation. These types of techniques use high-level bases to represent general deformations and refined ones for more detailed local deformations if necessary. Similarly, other mesh variations like embedded mesh, coarsened mesh, caged mesh, or skeletonized mesh offer extra control over the deformation with auxiliary grids.

Another important line of research focusing on improving the simulation performance of FEM is well-known as model reduction. Model reduction is designed to accelerate the simulation speed by reducing the numbers of degrees of freedom (DoFs) of the simulation system. It is achieved based on the assumption that the displacement of the deformable object can be well approximated using a small number of basis vectors. By projecting the original high-dimensional system onto the subspace spanned by these basis vectors, a reduced deformable model can be obtained. While the technique appears straightforward, it is rather challenging to construct a "good" subspace because the deformation that an elastic body will undergo is unknown. One of the most widely-used techniques is developed based on vibrational analysis or modal analysis. The basis vectors are calculated as the vibrational modes at different frequencies. High frequency modes are of higher elastic energies and less likely to occur in the upcoming simulation. Therefore, they are discarded for the system reduction. Modal analysis was employed for interactive deformable simulation as early as the late 1980s. Many significant contributions have been developed afterwards based on this technique such as character skinning, deformable animation control and editing, as well as subspace collision/contact. It has also been extended to simulate large deformation based on co-rotational elasticity, nonlinear deformable material and multi-domain simulation.

Besides modal analysis, some other methods are also used for constructing subspace bases. Some approaches used selected key points to build the subspace. Others utilized previously simulated results to create a time-varying subspace. Others used PCA to prune a pose set to obtain basis vectors. Recent contributions create a subspace by enriching local deformable features.

3 BACKGROUND AND OVERVIEW

Reduced Model Simulation.

For a given finite element mesh with n nodes, model reduction assumes that its displacement can be expressed as a linear combination of a set of modal vectors U, or u=Uq, which leads to a reduced Euler-Lagrange equation:

$$M_q \ddot{q} + f_{dis}(q,\dot{q}) + f(q) = f_{ext}, \qquad \text{Equation 1:}$$

where $M_q = U^T M U$, $f_{dis}$ and $f$ are the reduced mass matrix, dissipative force, and internal force respectively. The reduced internal elastic force $f$ is a function of the modal displacement q, and its Jacobian matrix is often referred to as the reduced tangent stiffness matrix $K_q$(q). With Rayleigh damping, $f_{dis}$ can be evaluated as $(\zeta M_q + \xi K_q(q))\dot{q}$. In practice, $q \in \mathbb{R}^r$ is a vector of much lower dimension (i.e., r<<3n). Thus, solving the nonlinear equation (1) is significantly faster than solving the its unreduced counterpart.

Figure 2:
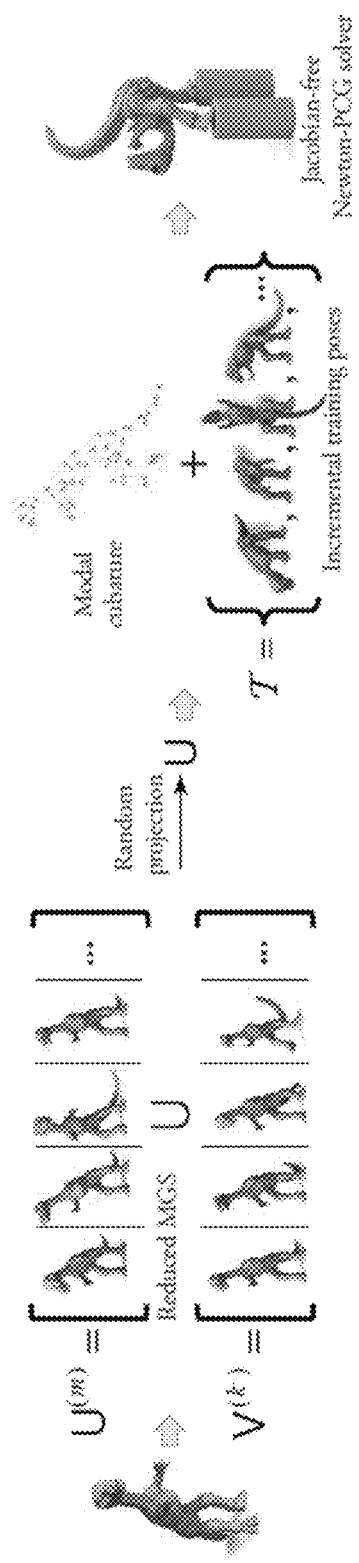
FIG. 2 illustrates example precomputation methods.

Precomputation Pipeline. FIG. 2 illustrates example precomputation methods described herein. Given an input mesh representing an object such as the 3D model at left, a series of regularized linear inertia modes $U^{(m)}$ may be constructed based on Krylov subspace iteration (§ 4.2). Next, asymptotic inertia derivatives may be computed to generate higher-order nonlinear modes $V^{(k)}$, which will help to capture the nonlinear shape deformations during the online simulation.

The linear and nonlinear modes may be condensed into a final mode matrix U using a random projection method (§ 4.3). Next, we uniformly sample a set of cubature points on the object. The cubature weights of those points are calculated for every reduced mode (§ 5).

The training proceeds in an iterative process: in each iteration, we incrementally add a few training poses (also referred to herein as training samples), and stop the iteration when a training error metric converges (§ 6). At that point, a reduced deformable model, including a set of deformation modes and related cubature weights, are ready for subsequent online simulations. The reduced deformable model may be simulated, e.g., using a Jacobian-free Newton-PCG solver at runtime.

4 FAST CONSTRUCTION OF REDUCED MODES

We start by describing our fast algorithm for precomputing reduced modes. We build our reduced modes based on the Krylov subspace method, a technique for model reduction in structural analysis. We propose a method to accelerate the mode construction process (§ 4.2) and further extend the Krylov iteration to handle higher-order and nonlinear deformations (§ 4.3).

4.1 Background on Linear Inertia Mode

Traditional reduced mode construction involves eigenvalue decomposition through a principle component analysis or linear modalanalysis. Eigen-decomposition is generally expensive and has limited space to accelerate. Instead, we use the Krylov subspace method, which has been used in structural analysis and in graphics for computing substructured modes. The resulting modes, known as linear inertia modes, up to an order of m are computed recursively:

$$U^{(m)} = A^{m-1} U^{(0)}, \text{where } A = K^{-1} \qquad \text{Equation 2:}$$

where K and M are respectively the rest shape stiffness matrix and mass matrix, and $U^{(0)}$ is for mode initialization. A typical choice is the six infinitesimal rigid-body modes of the object (i.e., $U^{(0)} = U^r$), wherein $MU^{(0)}$ can be interpreted as the inertia forces induced by rigid-body accelerations. Equation (2) essentially constructs a Krylov subspace of order m, denoted as $K_{(m)} \triangleq \text{span}(U^{(1)}) \cup \ldots \cup \text{span}(U^{(m)})$, where span(B) stands for the column space of a matrix B.

Unconstrained Inertia Mode.

Figure 3:
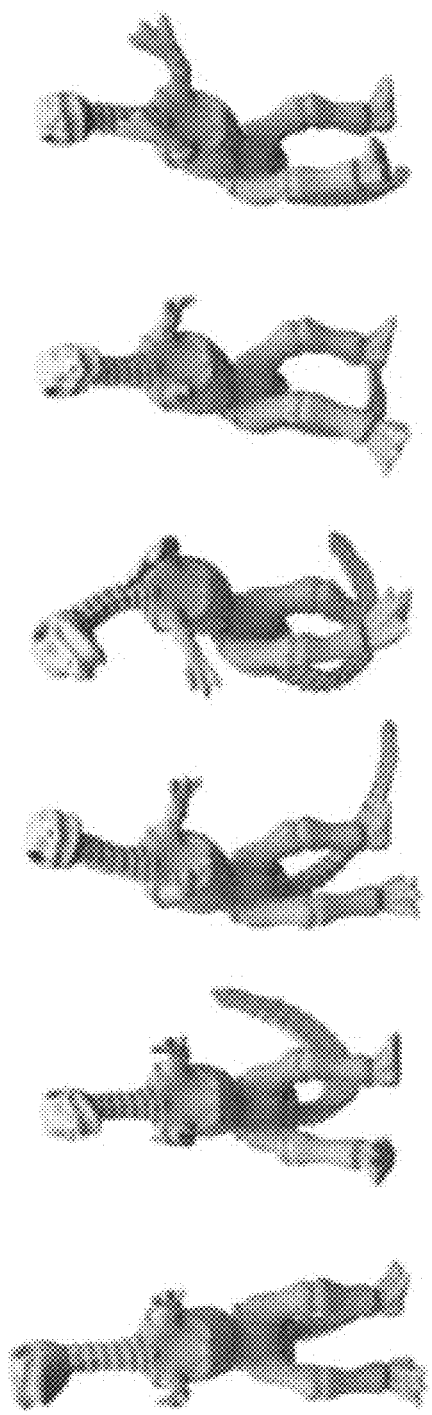
FIG. 3 illustrates an example first six linear inertia modes of an unconstrained model.

Eq. (2) may be used to construct reduced modes of substructure components with well-defined boundary conditions. However, when an object is unconstrained, K is singular, and thus Eq. (2) is unusable. We notice that a deformable object's motion is a superposition of its rigid-body motion $u^r \in \text{span}(U_r)$ and a pure deformation $u^d$. The subspace of reduced modes approximating $u^d$ should therefore be orthogonal to $U^r$, resulting in a constrained linear system for computing the unconstrained inertia modes. FIG. 3 illustrates an example first six linear inertia modes of an unconstrained model. The following equation may be used to construct unconstrained modes:

$$\begin{bmatrix} K & U^r \\ U^{rT} & 0 \end{bmatrix} \begin{bmatrix} U^{(m)} \\ \lambda \end{bmatrix} = \begin{bmatrix} MU^{(m-1)} \\ 0 \end{bmatrix} \quad \text{Equation 3}$$

where $\lambda$ is a Lagrange multiplier. This formula of constructing unconstrained modes is new.

Numerical Challenges.

In essence, constructing the Krylov subspace in Eq. (2) amounts to partially performing linear modal analysis, which solves an Eigen problem of KU=MUS (or equivalently $AU=US^{-1}$). This is because $K_{(m)}$ is a good approximation of the subspace spanned by leading eigenvectors and has been used in classic Eigen solvers such as Arnoldi and Lanczos methods. However, Krylov iterations undermine the linear independence among modal vectors: after few iterations, the mode matrix quickly becomes ill-conditioned. A recipe to address this problem is to apply regularization methods such as a mass Modified Gram-Schmidt (mass-MGS) process after each iteration. This process involves frequent computation of mass inner product between two modes $u_i$ and $u_j$ (i.e., $<u_i,u_j>_M \triangleq \bar{u}_i^T M u_j$), and prunes the i-th mode $u_i$ using previously regularized modes $u_j$, $j<i$:

$$u_i \leftarrow u_i - \sum_{j=1}^{i-1} \frac{\langle u_i, u_j \rangle_M}{\langle u_j, u_j \rangle_M} u_j. \quad \text{Equation 4}$$

The time complexity of processing all modes is $O(nr^2)$, which greatly increases the precomputation cost for a high-resolution mesh with a moderate number of reduced modes.

4.2 Reduced Mass-MGS

We propose a reduced mass-MGS to regularize modal vectors during the mode construction. We first accelerate the mass inner product, which effectively reduces the O(n) factor in the $O(nr^2)$ complexity. We further lessen the cost of repeated subtraction in Eq. (4) to lower the $O(r^2)$ factor.

Figure 4:
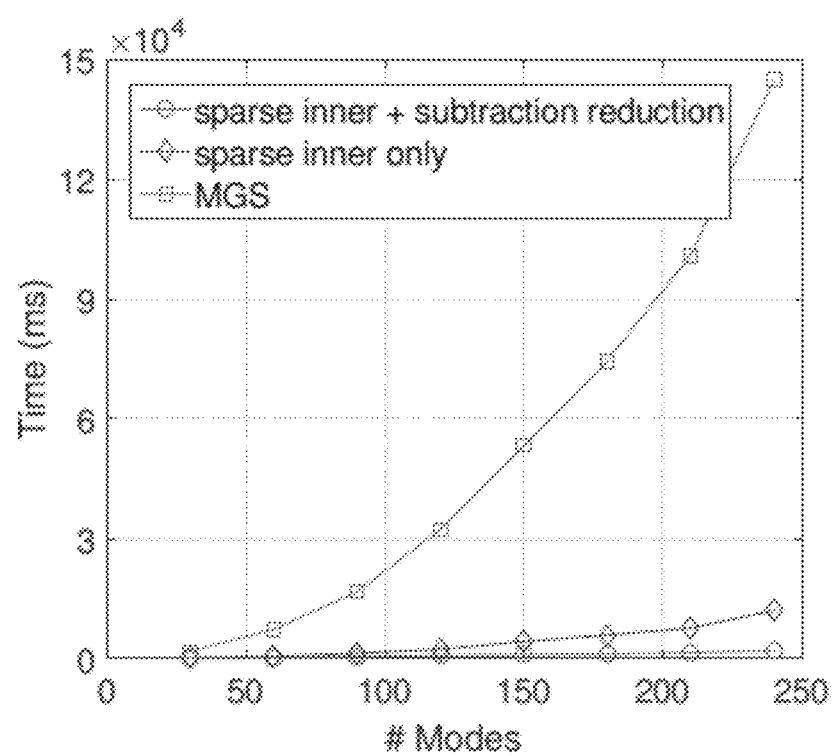
FIG. 4 provides a chart showing performance gain associated with reduced mass-MGS (rMGS) techniques disclosed herein.
Figure 5B:
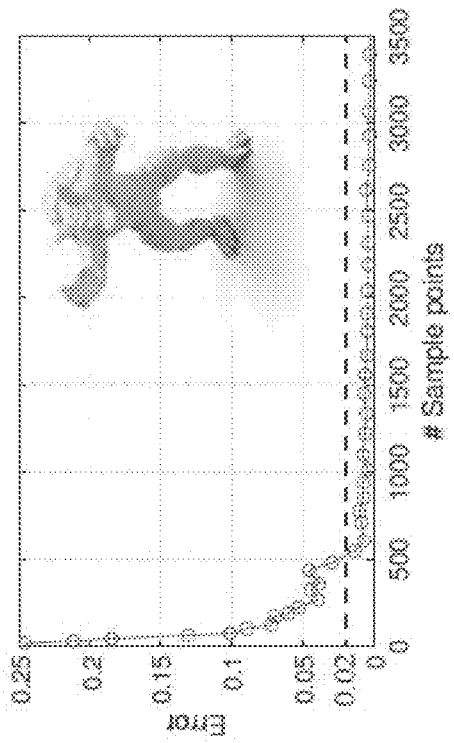
FIGS. 5A, 5B, 5C, and 5D illustrate example sparse inner product accuracies.
Figure 5D:
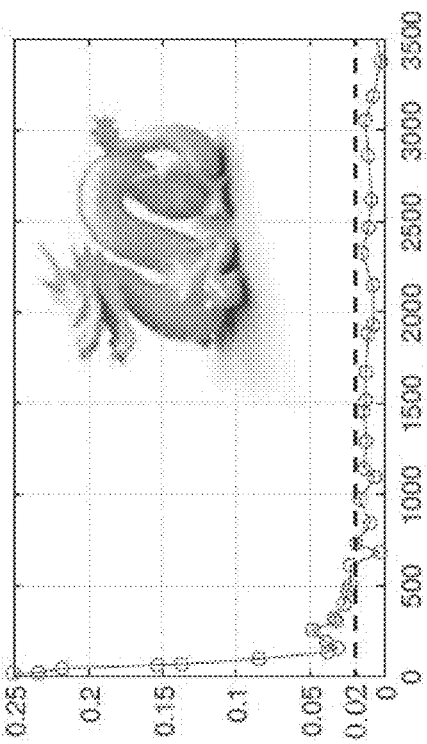
Figure 5A:
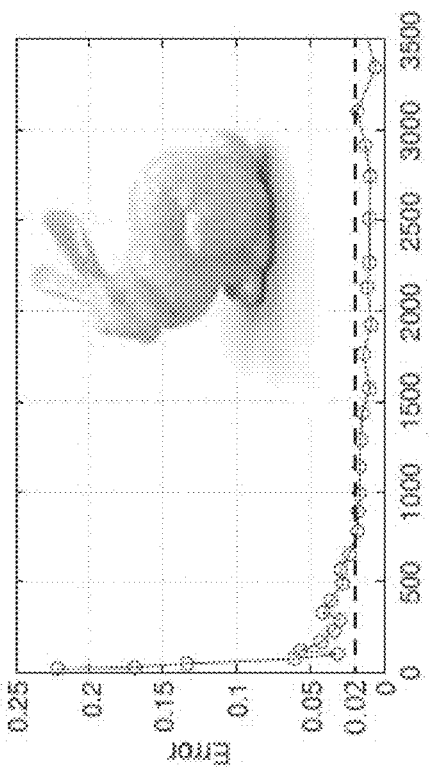
Figure 5C:
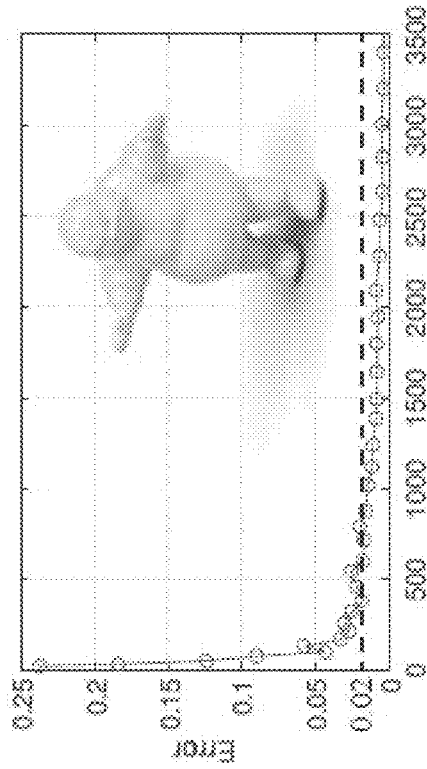

FIG. 4 illustrates the efficacy of disclosed methods. FIG. 4 provides a chart of performance gain of rMGS. Time used for regular MGS, rMGS with only sparse inner product, and rMGS with both sparse inner product and subtraction reduction ($\alpha_\tau$=0.001) are charted, based on the dinosaur example of FIG. 3.

Sparse Inner Product. The mass inner product between two displacement vectors $u_i$ and $u_j$ is a numerical discretization of a volume integral in the continuous setting, $$(u_i,u_j)_M \approx \int_\Omega \rho(x) u_i(x) u_j(x) dV, \quad \text{Equation 5:}$$

where $u_{i,j}(x)$ is a continuous displacement field corresponding to the discretized displacement vector $u_{i,j}$. Such a domain integral can be numerically evaluated using the Newton-Cotes integration rule, which sums up the integrand values at a set of sample points S over $\Omega$, $$\langle u_i, u_j \rangle_M \approx \langle u_i, u_j \rangle_S \triangleq \sum_{p \in S} w_p [u_i(p) \cdot u_j(p)], \quad \text{Equation 6}$$

where $u_i(p)$ and $u_j(p)$ are 3D displacement vectors at a sample point p. $w_p$ is a nonnegative weight associated with p. In the rest of this section, we use $<\bullet, \bullet>_s$ to denote our sparse inner product.

The Newton-Cotes rule requires sample points be evenly placed over the object volume $\Omega$. To this end, we create an axis-aligned bounding box of the mesh and subdivide the bounding box along three axes into cubic boxes. If a box B intersects with the input mesh, we add the finite element node nearest to the center of B into S and compute its weight as the total mass inside B, $w_p = \int_{B \cap \Omega} \rho(x) dV$. The section entitled, "Error Analysis of the Sparse Inner Product" provides an analytical error analysis of the sparse inner product. For at least some implementations, we find that setting $|S| \propto \log(n)$ provides a good balance between efficiency and accuracy as shown in FIGS. 5A, 5B, 5C, and 5D.

FIGS. 5A, 5B, 5C, and 5D illustrate example sparse inner product accuracies. The approximation errors of sparse inner products are charted with respect to the full-size mass inner products, i.e., $$\left| \frac{\langle u_i, u_j \rangle_S - \langle u_i, u_j \rangle_M}{\langle u_i, u_j \rangle_M} \right|$$

In FIGS. 5A, 5B, 5C, and 5D, $u_i$ and $u_j$ are from 240 linear inertia modes, and the errors plotted are the average of 57,360 sparse inner products in total.

Subtraction Reduction.

Next, we reduce the cost of $O(r^2)$ subtraction (i.e., Eq. (4)) in the mass-MGS. One observation is that among all pairs of linear inertia modes, a considerable portion is already near-orthogonal pairs even without the mass-MGS regularization. In other words, $(u_i, u_j)_M$ is small for many pairs of $u_i$ and $u_j$ (see statistics in FIG. 7).

FIGS. 7A, 7B, 7C, and 7D provide example statistics of modal pair orthogonality. FIG. 7A provides statistics for a bunny, FIG. 7B provides statistics for an Armadillo, FIG. 7C provides statistics for a Stay-Puft, and FIG. 7D provides statistics for a Dragon. The histogram statistics and the fitted normal distributions (red curves) for 28,680 direction cosines are computed using all pairs of 240 inertia modes.

Inspired by the above observation that among all pairs of linear inertia modes, a considerable portion is already near-orthogonal pairs even without the mass-MGS regularization, we define the sparse cosine as $$\alpha = \frac{\langle u_i, u_j \rangle_S}{\sqrt{\langle u_i, u_i \rangle_S \langle u_j, u_j \rangle_S}},$$

and use it as a sparse metric of the orthogonality test between $u_i$ and $u_j$. If $|\alpha|$ is smaller than a threshold $\alpha_\tau$, the corresponding subtraction (i.e., Eq. (4)) may be skipped. We outline the implementation pseudo-code with subtraction reduction in the section entitled, "Implementation Details of rMGS with Subtraction Reduction," where some implementation details are also highlighted. A visualization of the mass-orthogonality of the resulting mode matrix processed with our method is shown in FIG. 6. In the rest of this disclosure, we refer this reduced mass MGS as the rMGS process.

Figure 6B:
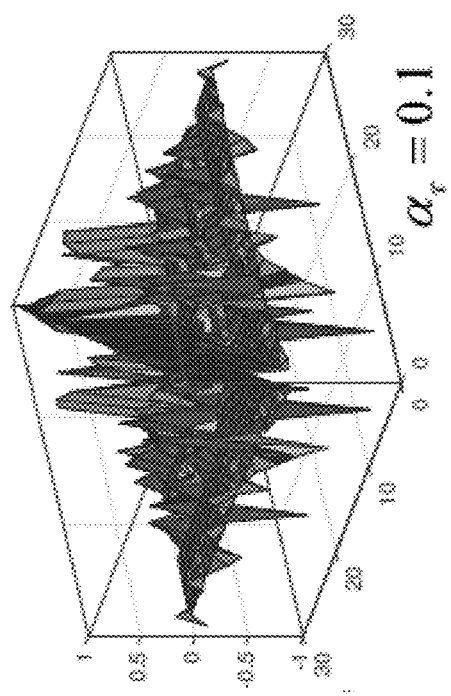
FIGS. 6A, 6B, 6C, and 6D illustrate mass-orthogonality of inertia modes using rMGS.
Figure 6D:
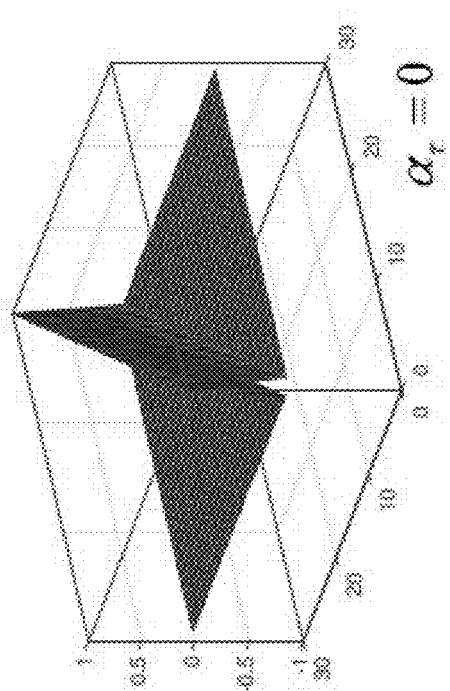
Figure 6A:
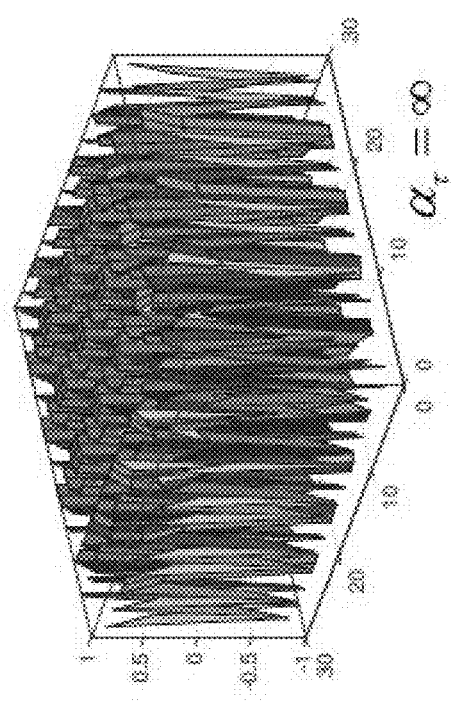
Figure 6C:
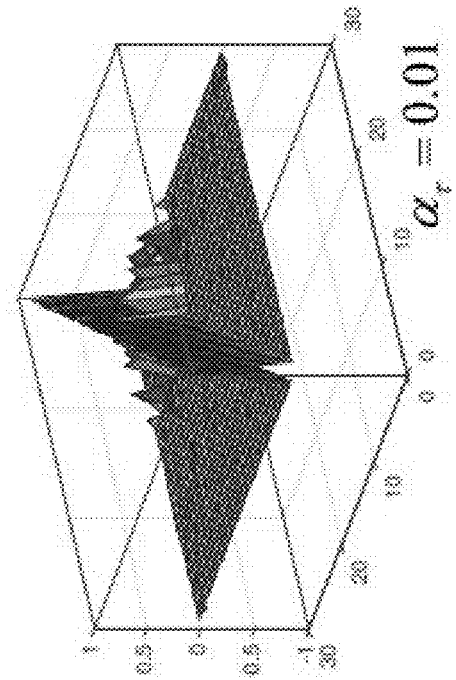

FIGS. 6A, 6B, 6C, and 6D illustrate mass-orthogonality of inertia modes using rMGS. We plot $M_q = U^T M U$ as a height field for the Stay-Puft model with 30 inertia modes. FIG. 6D shows a perfect mass-orthogonal mode matrix, wherein $M_q$ is an identity matrix. FIG. 6A shows $M_q$ calculated with an un-regularized mode matrix ($\alpha_r = \infty$). The 2-norm condition number of this matrix is over $10^{20}$ and the reduced system matrix becomes singular. We use $\alpha_r = 0.001$ in all of our examples. FIGS. 6B and 6C show intermediate mode matrices.

4.3 Nonlinear Inertia Derivatives

Linear modes are insufficient to capture nonlinear deformations. To address this limitation, a method of computing modal derivatives, the first-order directional derivatives of Eigen vectors, may be employed to expand the subspace and thereby incorporate the nonlinear deformations. While such methods are based on linear modal analysis, we show that our Krylov-based inertia modes can also be extended for capturing nonlinear deformations (§ 4.3.1). We call those nonlinear modes the inertia derivatives. More importantly, we derive an asymptotic formula for computing the inertia derivatives of an arbitrary order. Additionally, to refine the modal bases, we propose a novel random projection scheme as a faster alternative to the classic PCA (§ 4.3.2).

4.3.1 Generation of Nonlinear Inertia Derivatives

Recall that the linear inertia modes are computed recursively using $U^{(m)} = K^{-1} M U^{(m-1)}$. When the nonlinear deformation is considered, the stiffness matrix K is no longer constant. Instead, it depends on the current displacement u. Consider a small perturbation of $K = K(0)$, that is, $K(\Delta u) = K + \Delta K$. We then expand the inverse of $K(\Delta u)$ using Taylor series and obtain:

$$K(\Delta u)^{-1} = (K + \Delta K)^{-1} = K^{-1} - K^{-1} \Delta K K^{-1} + O(\|\Delta u\|^2).$$ Equation 7:

Applying Eq. (7) to the computation of inertia modes reveals an asymptotic expansion of nonlinear approximation:

$$K^{-1} M U^{(m-1)} - K^{-1} \Delta K K^{-1} M U^{(m-1)} + \ldots = U^{(m)} - K^{-1} \Delta K U^{(m)} + \ldots,$$

Here the first term is the linear inertia modes. To compute the first-order nonlinear modes, we express $\Delta K$ using the directional derivative of K along a direction u, $$K^{-1} \Delta K U^{(m)} = K^{-1}(H:u) U^{(m)},$$

where $H = \nabla K$ is the stiffness Hessian, a third-order tensor, and the semicolon operator indicates a tensor contraction. When u is chosen as individual linear modes, we obtain the formula of computing the first-order nonlinear inertia derivatives, $$v_{ij}^{(1)} = K^{-1}(H:u_i)u_j,$$

where both $u_i$ and $u_j$ are linear inertia modes, and the superscript of $v_{ij}$ indicates that it is a first-order nonlinear mode. We notice that this formula of computing $v_{ij}^{(1)}$ echoes a modal derivative formula, although our linear modes are computed in a different way.

More importantly, this line of derivation facilitates the computation of arbitrarily high-order nonlinear modes. Further expansion of Eq. (7) shows that $K(\Delta u)^{-1} = K^{-1} - K^{-1} \Delta K K^{-1} + K^{-1} \Delta K K^{-1} \Delta K K^{-1} + \ldots$, from which we can compute the second-order inertia derivatives, $$V^{(2)} = K^{-1}(H:u)V^{(1)},$$

where we use $V^{(1)}$ to denote the first-order nonlinear modal matrix, and $V^{(2)}$ is the second-order modal matrix. In general, the nonlinear inertia derivatives of order k can be written as:

$$V^{(k)} = K^{-1}(H:v)V^{(k-1)},$$

where v is a reduced mode in span $(V^{(1)}) \cup \text{span}(V^{(2)}) \cup \ldots \cup \text{span}(V^{(k-1)})$.

Discussion.

In theory, by carefully selecting first-order or even linear modes, one can always capture a complex deformation. So there exists a philosophical question: should one favor the increment of low-order modes over the use of higher-order ones? If some deformation priors are known—for instance, in a case where the external forces are given—one can carefully choose the initial Krylov vectors (i.e., $U^{(0)}$) to construct a fine-tuned subspace. One may also directly interpolate reduced modes according to anticipated shape changes. However, for geometrically complex models with large deformations, manually picking the "right" modes may not be straightforward. In those cases, using high-order inertia derivatives can be a simple and robust solution (FIG. 8).

Figures 8A, 8B, 8C, 8D:
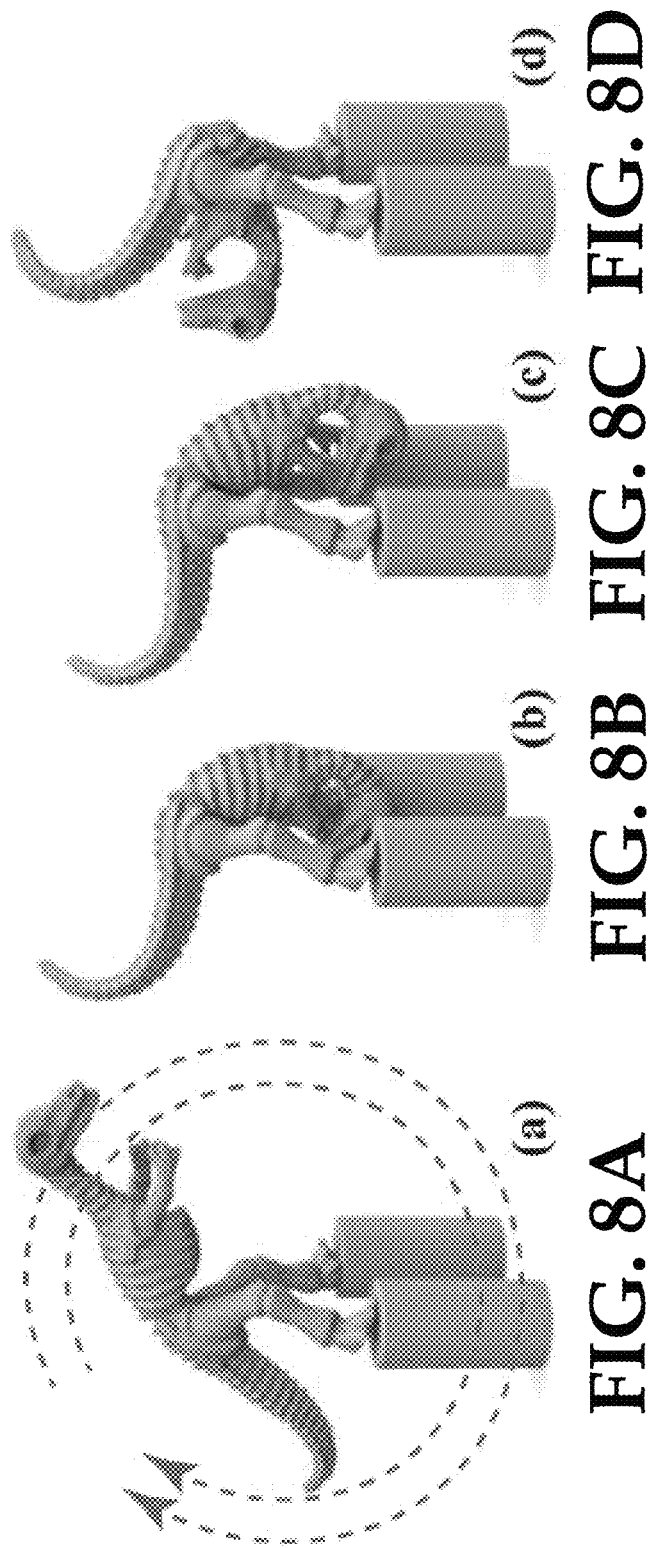
FIGS. 8A, 8B, 8C, and 8D illustrate an example bending comparison.
Figure 20:
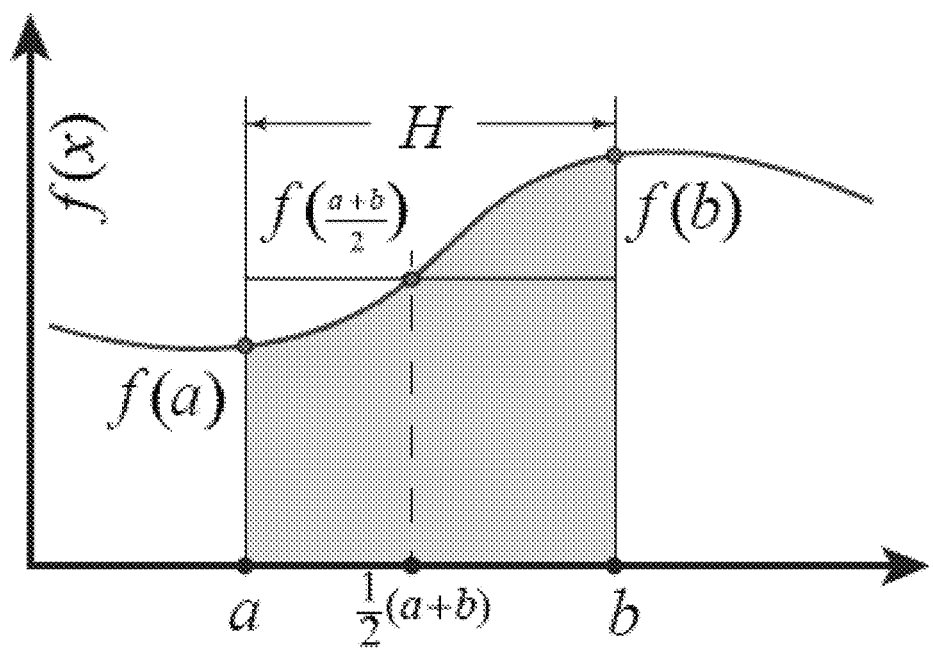
FIG. 20 an example of 1D open-type Newton-Cotes integration with midpoint rule.

FIGS. 8A, 8B, 8C, and 8D illustrate an example bending comparison. The highlighted head part of the dinosaur model undergoes a circular external forces. In FIG. 8A, 2 linear inertia modes are used, where $U^{(0)}$ contains only vertical and horizontal translations. In FIG. 8B, 2 linear inertia modes+3 first-order inertia derivatives are used. In FIG. 8C, 20 first-order modal derivatives (generated from 8 linear modal modes and 36 first-order modal derivatives with mass-PCA) are used. In FIG. 8D, 20 higher order inertia derivatives (2 linear inertia modes+3 first-order inertia derivatives+15 second-order inertia derivatives) are used.

4.3.2 Random Projection

As one chooses to use increasingly higher-order modes, the total number of modes increases exponentially (i.e., the column size of $V^{(k)}$ increases exponentially with respect to k), and thus the reduced simulation quickly slows down. Most existing work use PCA to select the most prominent modes out of the constructed ones, and compelling results have been reported. PCA has a time complexity of $O(\min((r^2)^3, n^3))$, assuming that the number of constructed modes comprising both linear and nonlinear modes is $O(r^2)$. In traditional modal-analysis-based precomputation, this is hardly a bottleneck, as the Eigen-decomposition for modal analysis is usually more expensive. However, our mode construction method has eliminated the use of Eigen-decomposition, leaving PCA indeed a performance bottleneck.

As a faster alternative of PCA, we propose an efficient method, which we call Random Projection (RP). This method is based on an observation: in a high-dimensional vector space, it is very likely that two random vectors are almost orthogonal to each other. This suggests that we can simply use a random thin matrix to condense the constructed modes.

Concretely, we first normalize the "importance" of the modes with various frequencies by scaling them according to their generalized Rayleigh quotient. Suppose there are m constructed modes, including both the linear inertia modes and nonlinear inertia derivatives. For every mode $u_i$, i=1 . . . m, we compute $u_i \leftarrow u_i (u^T K u_i)/(u^T M u_i)$. We then concatenate all the $u_i$ into a superset matrix $\tilde{U}$, and compute the final modal matrix U for the online simulation using $U = \tilde{U}R$, where R is a m×r matrix to condense the number of modes from m to r. The entry of R is randomly generated using:

$$R_{i,j} = \sqrt{3} \cdot \begin{cases} +1 & \text{with probability of } \frac{1}{6} \\ 0 & \text{with probability of } \frac{2}{3} \\ -1 & \text{with probability of } \frac{1}{6} \end{cases} \quad \text{Equation 8}$$

When m>>r, the column vectors of R are almost always near-orthogonal to each other. Thus, $\tilde{U}R$ is approximately a projection of span($\tilde{U}$) on a denser space determined by R. Since R is sparse, this matrix multiplication is much faster than running PCA.

Figure 9:
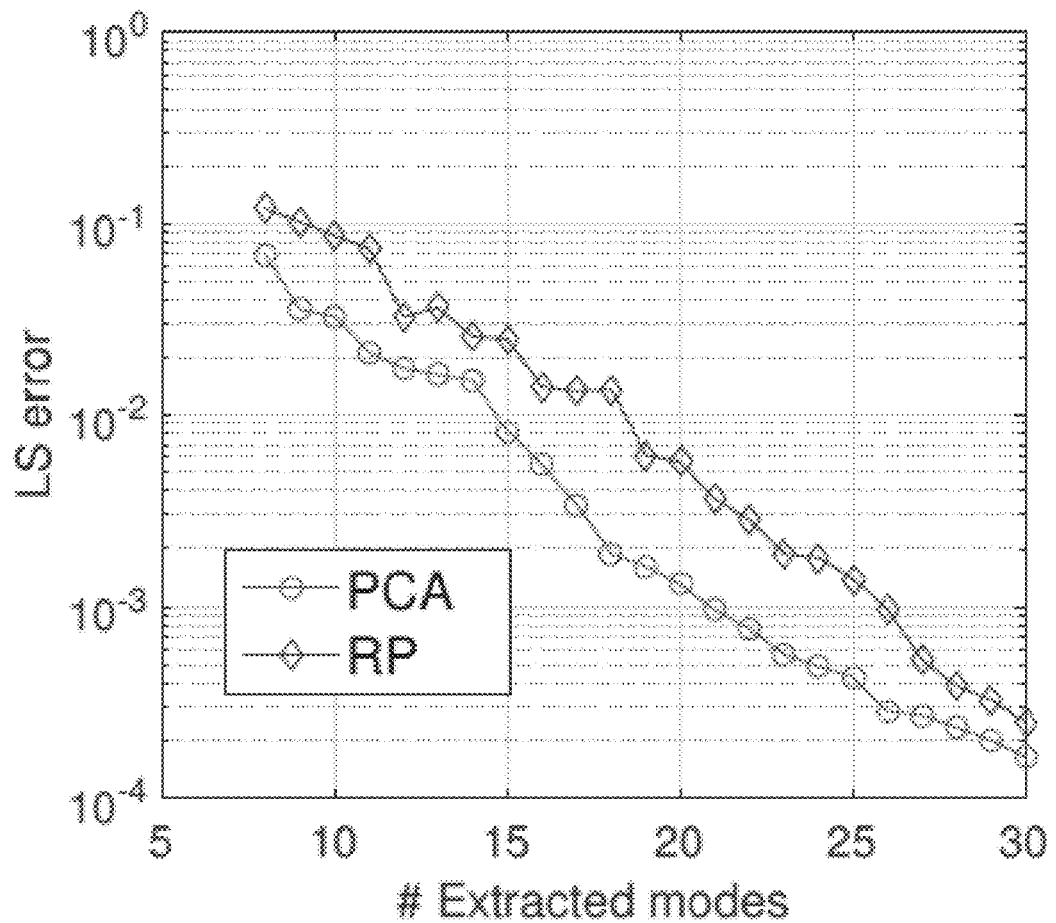
FIG. 9 illustrates a quality comparison between PCA and RP.

Unlike PCA, this projection cannot choose the most salient subspace indicated by eigenvalues. FIG. 9 illustrates a quality comparison between PCA and RP. We plot the average least-squares error of how well the extracted mode matrix U can express the original 324 candidates (24 linear+ 300 nonlinear modes). Note that the least-squares error axis is logarithmic.

As shown in FIG. 9, we plot the average least squares error when using U, extracted with either PCA or RP, to fit all the modes $u_i \in \tilde{U}$. When r is a very small number, U computed with RP yields a higher error due to its randomness in picking low-dimensional bases. Fortunately, their difference becomes quite subtle when the subspace size is moderately big (e.g., r=30). This result also well matches the performance analysis of RP from existing literatures. One contribution introduced another fast approximation of PCA. Unfortunately, this method does not have control over the size of the resulting mode matrix. Additionally, after being scaled by Rayleigh quotient, the norm of a mode is not a good metric for evaluating its "importance" in the context of deformable precomputation.

5 FAST PRECOMPUTATION OF MODAL CUBATURE

Using a reduced model for an efficient nonlinear deformable simulation requires a fast runtime computation of the internal elastic force and its Jacobian. Building on the numerical cubature scheme, a fast method for the runtime internal force evaluation may be used. During precomputation, it selects a set of cubature elements $\varepsilon$ on the mesh, and computes a weight $w_e$ for each element $e \in \varepsilon$. Then the reduced internal force $f(q)$ and its Jacobian $\partial f/\partial q$ are respectively computed as weighted summations over all the cubature elements:

$$f(q) \approx \sum_{e \in \varepsilon} w_e g_e(q) \text{ and } \frac{\partial f}{\partial q} \approx \sum_{e \in \varepsilon} w_e \frac{\partial g_e(q)}{\partial q}$$

where $g_e(q)$ is the reduced internal force induced by a modal displacement q at a cubature element e. While this scheme enjoys a fast runtime computation, the precomputation is highly expensive: it incrementally adds cubature elements following the residual gradient, which is calculated by exhaustive nonnegative least-squares (NNLS) solves.

Rationale.

We seek to accelerate the cubature precomputation to achieve an interactive performance. One straightforward attempt is again to exploit the Newton-Cotes rule: using evenly spaced cubature points to avoid repeated NNLS solves. However, to maintain sufficient approximation accuracy using the Newton-Cotes rule, we need to sample cubature points densely, which in turn burdens the NNLS in precomputation and the force evaluation at runtime. We propose a simple solution to address this dilemma: instead of using a single weight at each cubature point, we prepare multiple weights, each for an individual reduced coordinate. Our experiments (see FIG. 15) show that such a simple extension allows interactive cubature training while retaining a comparable accuracy as the standard optimized training scheme. In addition, we note that this extension also lays out an important foundation to enable a faster computation of training data, which is to be elaborated in the next section.

Method.

Concretely, for every component $f^j$ of the reduced internal force $f$, we precompute a set of cubature weights $w_e^j$, and approximate r as $$f(q) \approx \sum_{j=1}^{r} \left( \sum_{e \in \varepsilon} w_e^j g_e^j(q) \right) e^j$$

where $e^j$ is the canonical unit basis vector of $\mathbb{R}^r$ (e.g., $e^1$=[1, 0, ... ]$^T$); $g_e^j$ is the j-th component of $g_e$, the internal force at a cubature element e. We stack $w_e^j$ for all $e \in \varepsilon$ into a vector $w^j$ and precompute it by solving a NNLS problem, $A^j w^j = b^j$, where $A^j$ and $b^j$ are constructed based on a training set $\mathcal{T}$ with T samples. Specifically:

$$A^j = \begin{bmatrix} \frac{g_1^{j,1}}{\|f^1\|} & \cdots & \frac{g_{|\varepsilon|}^{j,2}}{\|f^2\|} \\ \vdots & \ddots & \vdots \\ \frac{g_1^{j,\mathcal{T}}}{\|f^\mathcal{T}\|} & \cdots & \frac{g_{|\varepsilon|}^{j,\mathcal{T}}}{\|f^\mathcal{T}\|} \end{bmatrix}, \quad b^j = \begin{bmatrix} \frac{f^{j,1}}{\|f^1\|} \\ \vdots \\ \frac{f^{j,\mathcal{T}}}{\|f^\mathcal{T}\|} \end{bmatrix}$$

where $f^{j,i}$ denotes the j-th component of a reduced internal force $f^i$ in the i-th training example.

To distinguish from the standard cubature training, to which we refer as Optimized Cubature (OC), we refer to our cubature scheme as Modal Cubature (MC). Using MC, the reduced internal force Jacobian can be written as $$K_q = \frac{\partial f}{\partial q} \approx \sum_{j=1}^{r} \sum_{e \in \varepsilon} w_e^j \left( e^j \otimes \frac{\partial g_e^j}{\partial q} \right) \quad \text{Equation 9}$$

We also sample the positions of cubature points evenly using axis-aligned voxels, as used in the sparse inner product step (§ 4.2). While we need to solve a NNLS problem for every single component of the reduced coordinate, the size of each NNLS problem is much smaller, and all the solves can be performed in parallel, yielding an interactive precomputation performance (1000-5000×) faster calculation.

Extension.

It is noteworthy that the Jacobian matrix resulting from Eq. (9) is not necessarily symmetric. One can approximately symmetrize the matrix $K_q$ using $K_q \leftarrow \frac{1}{2}(K_q+K_q^T)$. On the other hand, we propose a new Newton-PCG solver, which requires no runtime evaluation of the Jacobian matrix, and thus completely sidesteps the asymmetry problem. We describe this runtime solver in the section entitled, "Jacobian-free Newton-PCG Solver," as an extension of our precomputation pipeline.

6 INCREMENTAL GENERATION OF TRAINING DATA

Most reduced simulation methods compute the cubature weight from a training data $\mathcal{T}$, which is often taken as granted. One reasonable strategy, when there does not exist a prior training set, is to blindly sample a deformation subspace. For instance, the modal displacement following a normal distribution may be sampled and used in a full-space simulation to evaluate the corresponding internal forces and eventually, assemble the training dataset. With our goal of expediting the entire precomputation pipeline, we wish to carefully generate the training samples to avoid full-space simulation as much as possible. To the best of our knowledge, this problem has been largely unexplored.

---
Algorithm 1
Incremental training data generation.
---

1: $\Delta e \leftarrow \infty$
2: $N_I \leftarrow \frac{3}{2}|\mathcal{E}|$;  ▷ the size of the initial training set
3: for each mode vector $u_i$, $i = 1 \ldots r$ do
4: $Q_i \leftarrow \frac{u_i^T K u_i}{u_i^T M u_i}$; $E_i \leftarrow 0$; $\sigma_i \leftarrow \frac{1}{\sqrt{Q_i}}$
5: end for
6: while $\Delta e > e_\tau$ do
7:   for $t = 1 : N_I$ do
8:     generate $q_i^t$ following $\mathcal{N}(E_i, \sigma_i)$ for all $i = 1 \ldots r$
9:     compute internal force $f(q)$
10:     $\mathcal{T} \leftarrow \mathcal{T} \cup \{q, f\}$
11:   end for
12:   NNLS fitting over $\mathcal{T}$
13:   update $\Delta e$
14:   update $\mathcal{T}_e$  ▷ stores poses with top 20% fitting error ▷ recenter samples
15:   $q \leftarrow avg(\mathcal{T}_e)$
16:   for $i = 1 : r$ do
17:     $E_i \leftarrow q_i$; $\sigma_i \leftarrow \begin{cases} \frac{1}{\sqrt{Q_i - E_i}}, & E_i \geq 0 \\ \frac{1}{\sqrt{Q_i + E_i}}, & E_i < 0 \end{cases}$
18:   end for
19:   $N_I \leftarrow \frac{1}{3}|\mathcal{E}|$
20: end while

---

Our modal cubature scheme (§ 5) allows us to reduce the cost of training sample generation by incrementally expanding the training dataset. MC differs from the traditional optimized cubature scheme, wherein the training data is given, and their goal is to find the best set of cubature points. In contrast, with a fixed set of cubature points, we seek for a proper size of training dataset.

6.1 Observations and Rationale

Figure 10A:
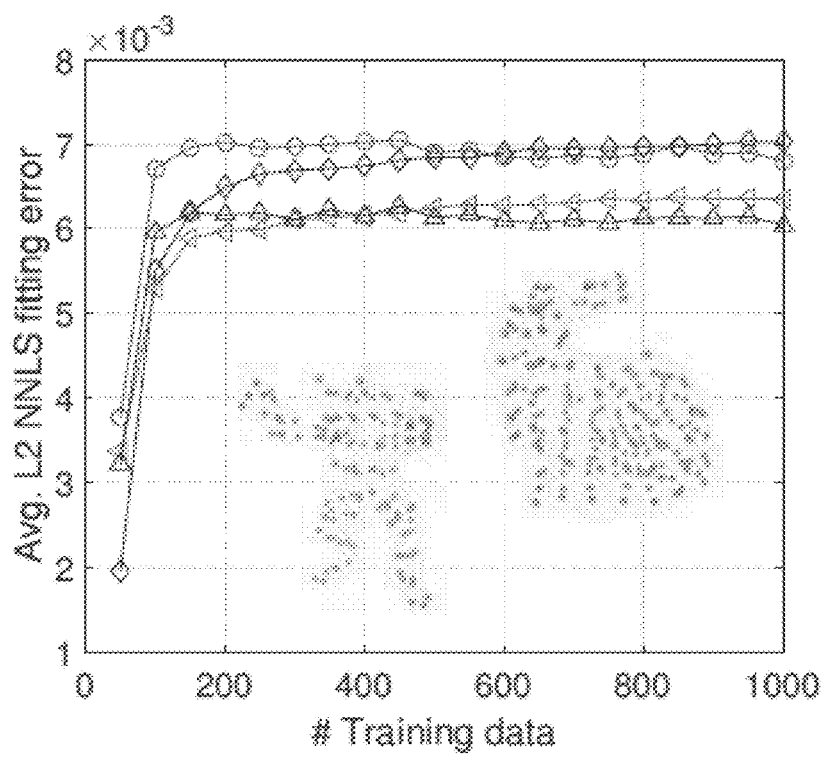
FIGS. 10A and 10B illustrate observations in cubature training
Figure 10B:
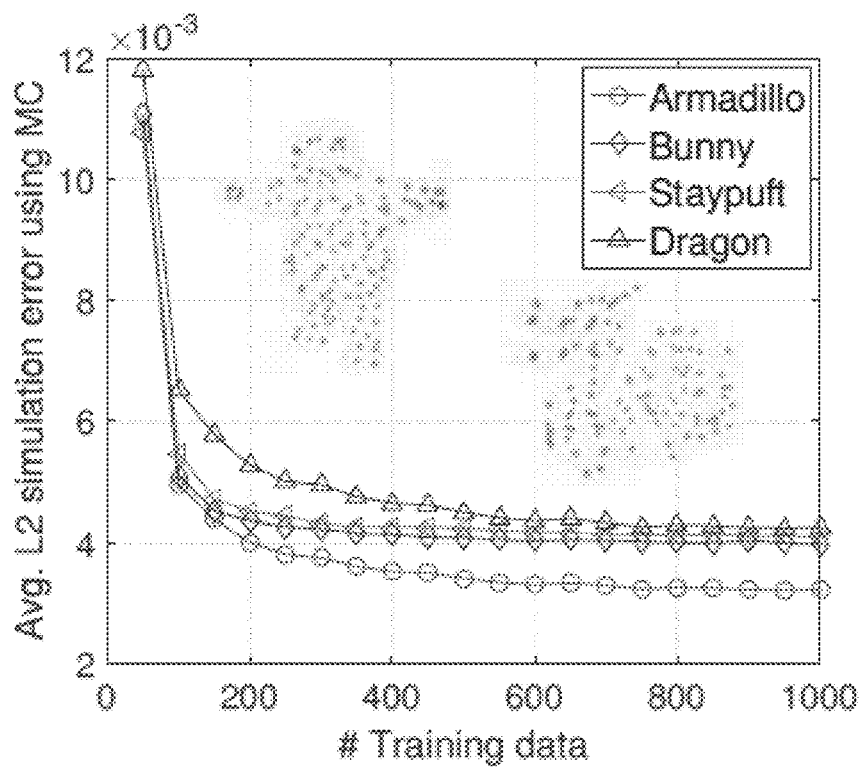

Our training data generation algorithm is inspired by two observations, which can be understood with reference to FIGS. 10A and 10B. FIGS. 10A and 10B illustrate observations in cubature training. Four models (Armadillo, bunny, Stay-Puft and dragon) are tested under the same cubature sampling resolution. FIG. 10A illustrates the NNLS fitting error during a cubature weights calculation. FIG. 10B illustrates the MC simulation error with respect to 50K full-space random simulations.

In a first observation, it is known that the numerical accuracy of approximating a force integral using the Newton-Cotes rules is bounded by the sampling interval (see the section entitled, "Error Analysis of the Sparse Inner Product"). This implies that the increase of training samples has a diminishing return on the accuracy improvement, as demonstrated in FIG. 10B, where we incrementally add randomly generated training samples and evaluate the Modal Cubature simulation error, and where the MC simulation error may be calculated as the average deviation from 50K random full-space simulations. Initially, when the training data is insufficient, the error is large. However, as we continue to expand the training dataset, the error is eventually bounded from below.

Our second observation looks at the change of the normalized NNLS fitting error shown in FIG. 10A. The error is computed as:

$$e = \frac{1}{T} \sum_{j=1}^{r} \frac{\|A^j w^j - b^j\|}{\|b^j\|} \qquad \text{Equation 10}$$

Initially, when T is small, the NNLS problem is underconstrained, and thus the fitting error is low. As more samples are added in the cubature training, the fitting error grows, but eventually becomes bounded from above. One interpretation of this observation is from the Monte Carlo integration point of view. The error defined in Eq. (10) computes the averaged fitting error across all training samples. As the number of samples increases, it is equivalent to evaluating, using Monte Carlo integration, the expected fitting error in the deformation subspace. Since the number of cubature points is fixed, the expected fitting error is bounded.

6.2 Incremental Training Samples

The above interpretation from a Monte Carlo point of view suggests that the error metric defined in Eq. (10) can be a natural indicator for when to stop adding training samples. One simple algorithm is as follows: we incrementally add samples into the training dataset. Every time when adding a training sample, we generate a reduced modal pose whose component $q_i$ follows a Gaussian distribution, $q_i \sim \mathcal{N}(E_i, \sigma_i)$, where $E_i = 0$ and $\sigma_i = 1/\sqrt{Q_i}$. Here Qi is the generalized Rayleigh quotient of the modal vector $u_i$. It is an estimation of the effective eigenvalue of $u_i$, so the low-frequency mode will produce samples with larger variance. We use the generated reduced coordinate to evaluate a displacement vector and resulting internal forces using a full-space simulation. After we add a few samples, we update the fitting error Eq. (10), and evaluate its corresponding change $\Delta e$. We stop generating new training samples, if $\Delta e$ is smaller than a threshold $e_\tau$ ($e_\tau = 0.005$ in all of our examples).

We further improve our training pose sampling algorithm by adding more poses in under-sampled regions in the reduced deformation space. As detailed in Algorithm 1, we start by generating $3/2|\varepsilon|$ samples using the Gaussian distribution described above (line 7-11 of Algorithm 1), so the resulting NNLS problem is over-constrained. We then iteratively add more samples. In each iteration, we add $N_I$ samples. ($N_I = 1/3|\varepsilon|$ in all our examples). At the end of each iteration, we adjust $E_i$ and $\sigma_i$ for subsequent sampling (line 14-18 of Algorithm 1) based on the training poses that have large fitting errors. To this end, we maintain a set of training poses $\mathcal{T}_e$ that have the top 20% fitting error among currently assembled training poses. For the next sample generation, we set $E_i$ as the averaged modal pose of $\mathcal{T}_e$, and adjust $\sigma_i$ such that they are in the radius of the original Gaussian distribution (line 17 of Algorithm 1). The iteration process stops if the error change $\Delta e$ is below a threshold. The efficacy of this improved algorithm is shown in FIG. 11.

Figure 11:
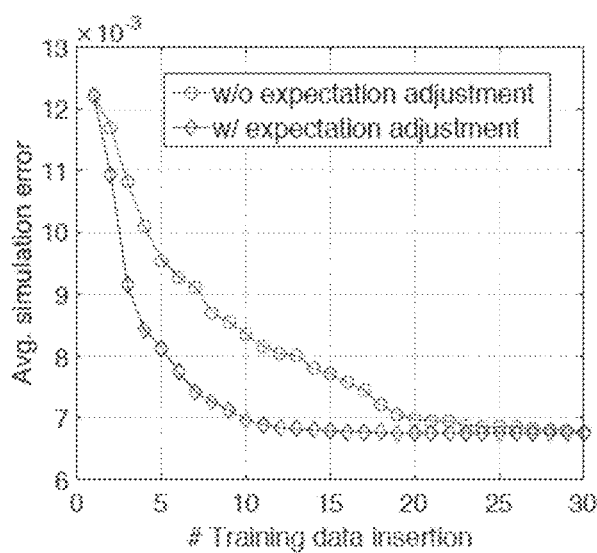
FIG. 11 illustrates effectiveness of expectation adjustment.
Figure 12A:
FIGS. 12A, 12B, 12C, and 12D illustrate example multi-resolution meshing by voxelization.
Figure 12B:
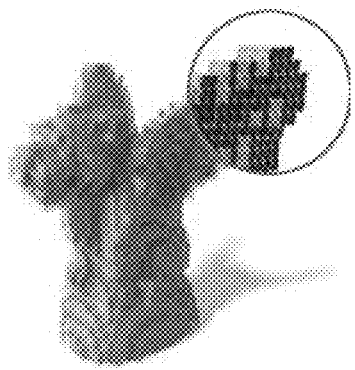
Figure 12C:
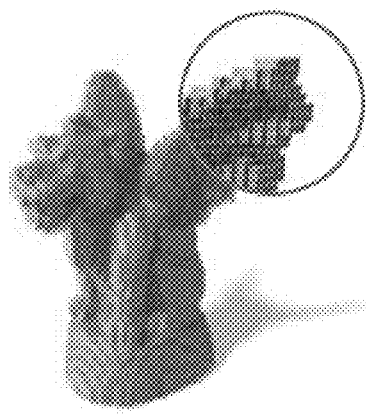
Figure 12D:
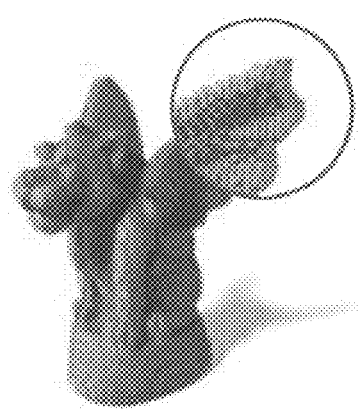

FIG. 11 illustrates effectiveness of expectation adjustment. We plot the MC simulation error with respect to 50K randomly generated full-space results using the incremental training. The Armadillo model is tested with $N_f=35$. The error converges faster with the expectation adjustment (i.e., Algorithm 1).

In every iteration, we generate $N_f$ training samples in parallel. With our incremental training generation, we are able to stop computing training samples whenever they become unnecessary. As a result, the training process is largely accelerated. Even for large-scale models, the entire precomputation, including the generation of training data, can be completed within tens of seconds. Of course, if $\mathcal{T}$ is given a priori in certain cases, (or not required, for instance one may choose to use geometrical warping to produce nonlinear deformation as in the example shown in FIG. 18), the precomputation can finish within seconds/milliseconds.

7 VALIDATION AND APPLICATIONS

In experiments to test the proposed precomputation pipeline to evaluate its performance, scalability, quality, and versatility, the disclosed methods may be implemented, e.g., using Microsoft Visual Studio 2010 on a Windows 8.1×64 desktop equipped with an Intel i7-5960 3.0 GHz CPU (with eight physical cores) and 32G on-board RAM. pThread may be used to parallelize the computation for modal cubature training and training data generation. Most proposed numerical algorithms (e.g., sparse inner product, pMGS, nonnegative least square and Jacobian-free Newton-PCG solver) may be implemented from scratch with the help of the Intel MKL libraries.

7.1 Validation

Scalability Test.

The scalability of our modal construction algorithm may be tested using the gargoyle model. To ease the control of number of elements, we voxelize the model, so we can generate tetrahedral meshes whose sizes range from 50K to 1M, such as illustrated in FIGS. 12A, 12B, 12C, and 12D.

FIGS. 12A, 12B, 12C, and 12D illustrate example multi-resolution meshing by voxelization. The gargoyle model is voxelized at different resolutions to generate tetrahedral meshes from 50K to 1M elements.

The computation time for generating linear inertia modes (our method) and linear Eigen modes (previous method) may be recorded in a table. In some embodiments, the linear inertia modes may be computed using the PARDISO solver shipped with MKL. The modal analysis-based modes may be computed using Matlab 2015a's built-in eigs function with multi-threading enabled. We found that eigs is faster than ARPACK++ or SLEPc, another two widely-used open source packages for sparse Eigen problems. This may be because Matlab uses MKL to handle sparse linear system, which has better performance on our hardware platform (Intel CPU). These tests show that with the help of rMGS, the construction of inertia modes may be up to 20-30× faster than linear modal analysis on average. Under such circumstance, mode refinement with PCA becomes a costly operation in the precomputation. As plotted in FIG. 13, the computation time for PCA quickly scales up with increased mesh resolution. In the meantime, random projection is much faster and scalable.

Figure 13:
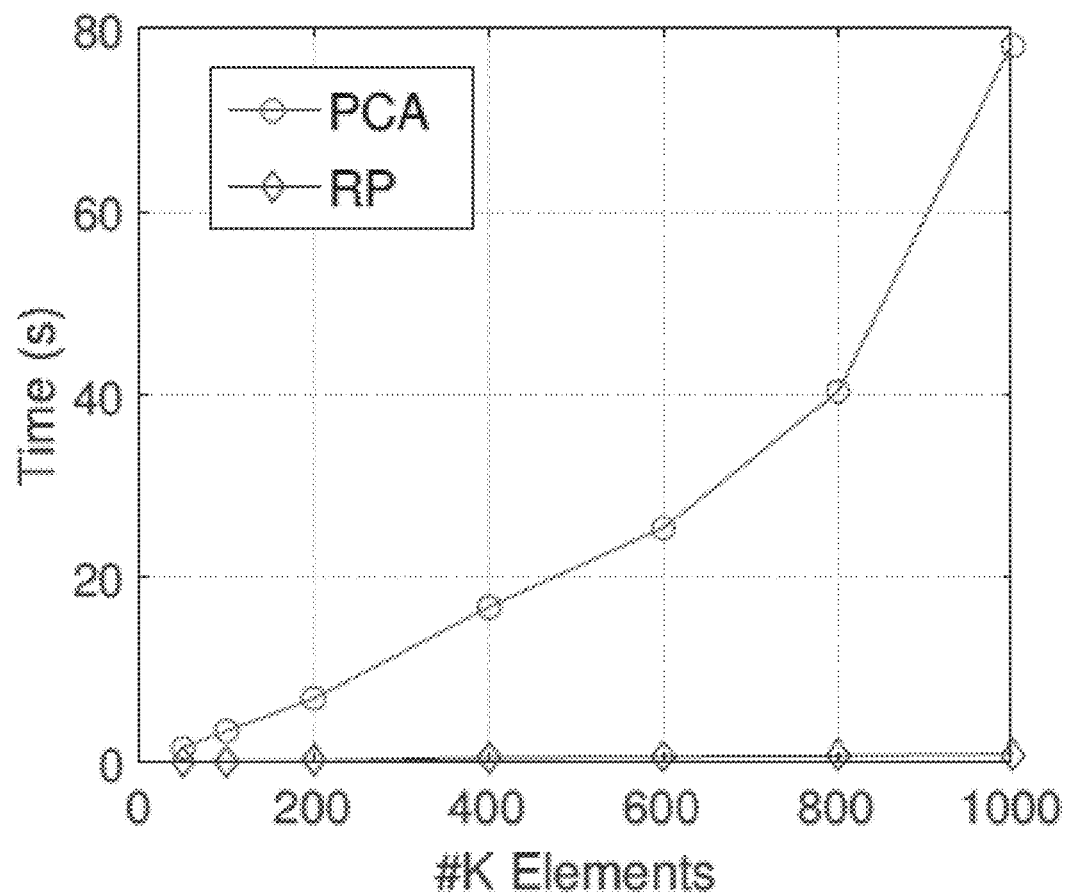
FIG. 13 illustrates an example scalable test of PCA and RP.

FIG. 13 illustrates an example scalable test of PCA and RP. The same gargoyle models as in FIG. 12 are tested in this example. We record the time used to construct a 30-dimension modal matrix out of 189 mode candidates (18 linear inertia modes+171 nonlinear inertia derivatives) using both PCA and RP.

Simulation Quality.

Figures 14A, 14B, 14C:
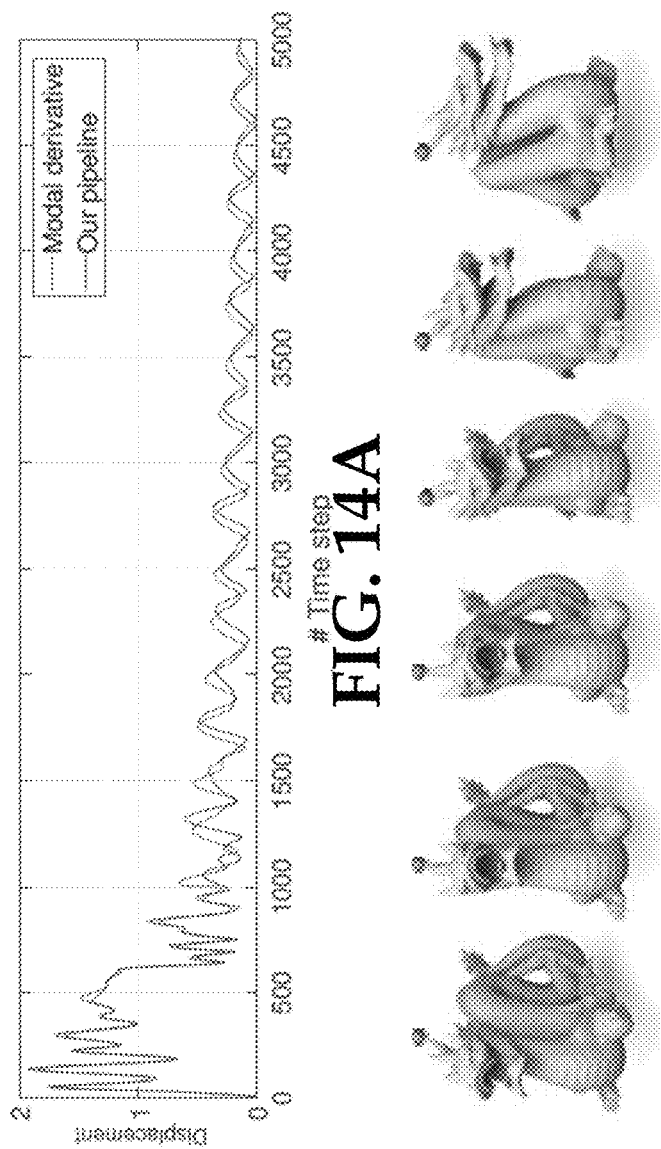
FIGS. 14A, 14B, and 14C provide a quantitative comparison between deformable animations produced with standard modal derivatives, and deformable animations produced according to an embodiment of this disclosure.

FIGS. 14A, 14B, and 14C provide a quantitative comparison between deformable animations produced with standard modal derivatives, and deformable animations produced according to an embodiment of this disclosure. St. Venant-Kirchhoff material model is adopted. FIG. 14A is a graph showing magnitude of the displacement at the dragon's horn at different frames. FIG. 14B includes snapshots taken from an animation produced using classic modal analysis/derivative. FIG. 14C includes snapshots produced using our precomputation method.

It can be seen in FIG. 14 that while a variety of approximation and acceleration methods have been employed, the proposed precomputation pipeline produces results that are visually comparable to the standard modal analysis/derivative-based precomputation approach. Yet, our approach enjoys a much faster precomputation time. Our method may operate in the range of 20× faster than traditional methods for modal construction.

Modal Cubature.

We compare the performance of the modal cubature with the standard optimized cubature on a training set $\mathcal{T}$, T=1000. We adopt the lazy cubature optimization strategy, wherein the new seed element is picked out of a subset of 1,000 elements. Both training strategies are tested using the Armadillo model. We choose multiple NNLS fitting error levels. For each error level, we examine the number of cubature elements needed to reach the error level, and compare the cubature training performances of both schemes.

Figure 15A:
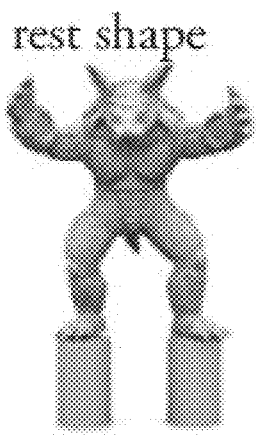
FIGS. 15A, 15B, and 15C illustrate comparative animations using different training strategies.
Figure 15B:
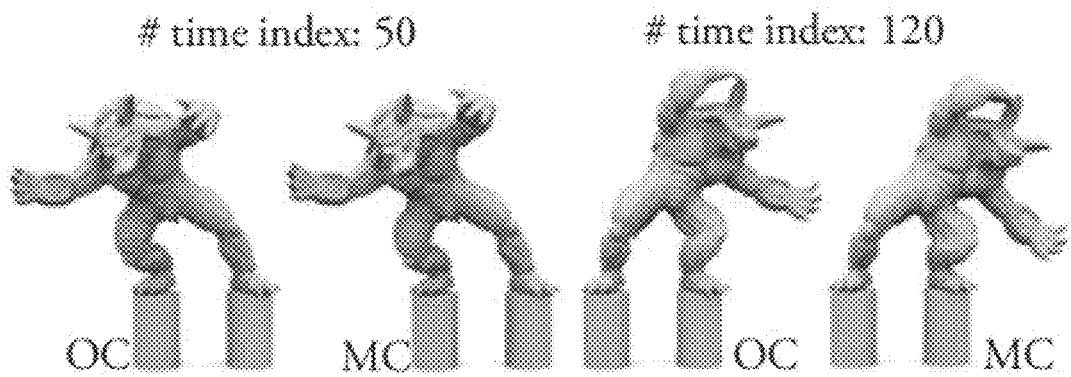
Figure 15C:
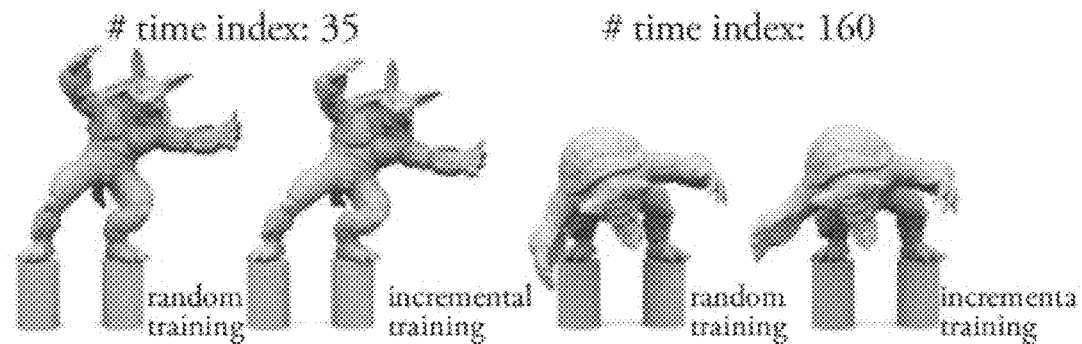

FIGS. 15A, 15B, and 15C illustrate comparative animations using different training strategies. FIG. 15A illustrates an example Armadillo model at rest. FIG. 15B illustrates animation snapshots using OC training and MC training with (T=1000). FIG. 15C illustrates animation snapshots using incremental training (T=225) and regular random training (T=5000).

When training poses are not available, we incrementally generate $\mathcal{T}$ while tracking the change of the NNLS fitting error (i.e., Algorithm 1). This strategy need only involve a few hundred training poses (although more may be used if desired) and produces deformable animation of similar quality to the ones generated using a larger training set. Because of the per-mode weight storage in MC training, MC consumes r times more memory than OC does. One drawback of MC is associated with the asymmetry of the resulting Jacobian matrix, which can result in a larger numerical error than OC when used to compute the force gradient. Fortunately, the proposed Jacobian-free PCG solver in the section entitled, "Jacobian-free Newton-PCG Solver," addresses this issue. In all our examples, our inner PCG solver is able to converge within 3 to 5 iterations (we set the convergence threshold as 0.001). The St. Venant-Kirchhoff material model is adopted in both comparisons.

Free-moving deformable bodies can be well accommodated within our framework. FIGS. 16A, 16B, and 16C illustrate a series of snapshots from a free-floating deformable simulation using unconstrained nonlinear inertia modes. 15 dragon models fall onto the staircase. Each model has 18 nonlinear unconstrained inertia modes, and we use the generalized Newton-Euler equation to handle the coupling between deformable and rigid-body motion. Because all the dragons have the same rest shape geometry, the precomputation can be accomplished in about 4.2 seconds.

7.2 Applications

Application I: Multi-domain Simulation with High-order Nonlinear Modes. Our precomputation pipeline can work in tandem with different types of simulation methods and hyperplastic materials. Beside the typical single-domain solid deformable simulation, here we illustrate the application of our precomputation in a substructured simulation. Following the state-of-the-art domain decomposition methods, precomputation may be localized at small-size domains.

FIGS. 17A, 17B, 17C, and 17D illustrate animation snapshots of a maple tree model, in an example multi-domain simulation with high-order nonlinear modes. The maple tree is simulated with a tetrahedra mesh of 1102K elements grouped into 513 domains, and the Mooney-Rivlin material model is used. Second-order nonlinear inertia derivatives are used at the leaf domains where $r_{leaf}=35$. In this example, domains are of different geometries from each other, which means the local precomputation at domains cannot be reused. The second order inertia modes corresponding to translational motions are computed at leaf domains. The precomputation of all the domains took less than a minute.

Application II: Simulation-in-the-loop Character Animation. The proposed precomputation pipeline allows a fast preview of physics-based animation on the top of the classic skeleton-driven character animations. In this application, the user is able to tweak material parameters of the character. Owing to the proposed fast precomputation, we are able to update the reduced model and rerun the simulation all interactively.

Figure 18:
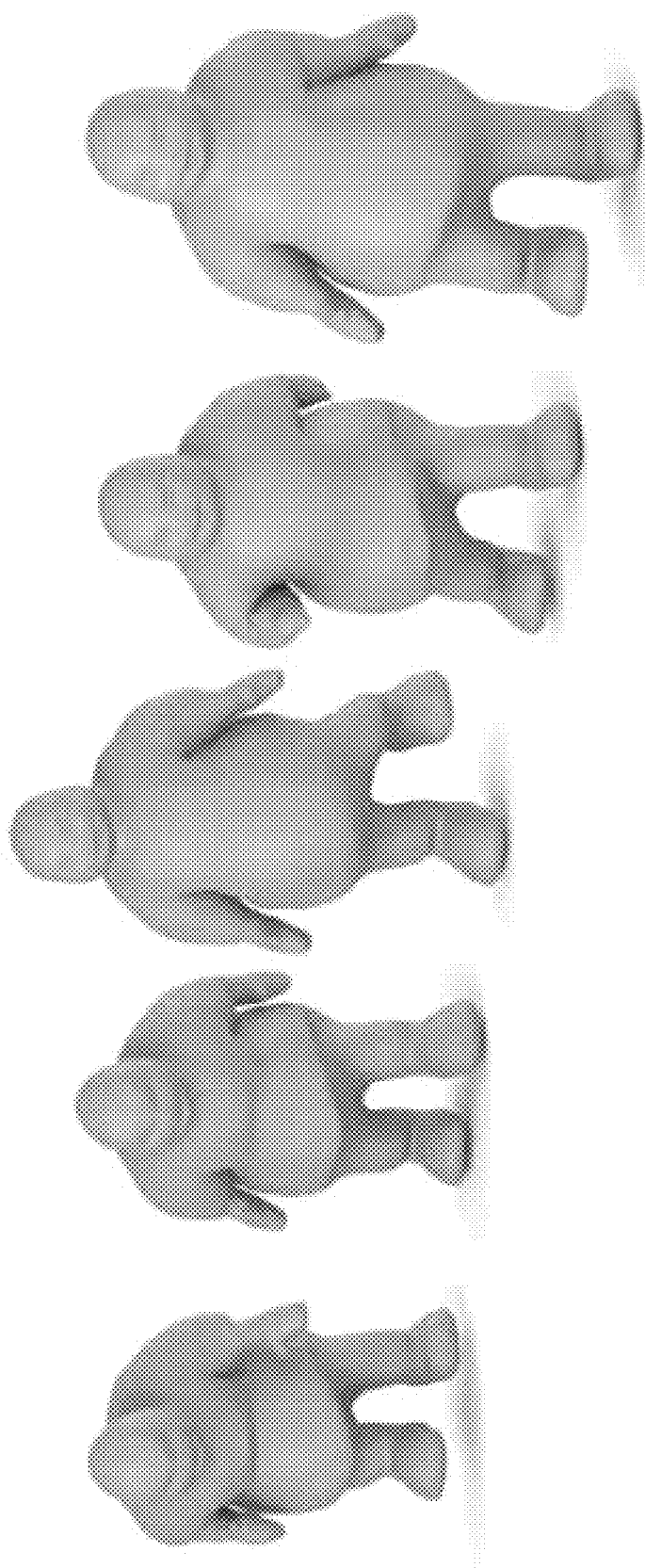
FIG. 18 illustrates an example simulation-in-the-loop character.

FIG. 18 illustrates an example simulation-in-the-loop character. FIG. 18 provides snapshots of a simulation that applied a deformable skinning to the animation of a walking Stay-Puft. We apply physics-based character skinning using 30 unconstrained linear inertia modes with geometric warping, triggered by the inertia forces from the rigid-body motion. The resulting animation is almost instantly available with a 0.8 second precomputation.

Figure 19:
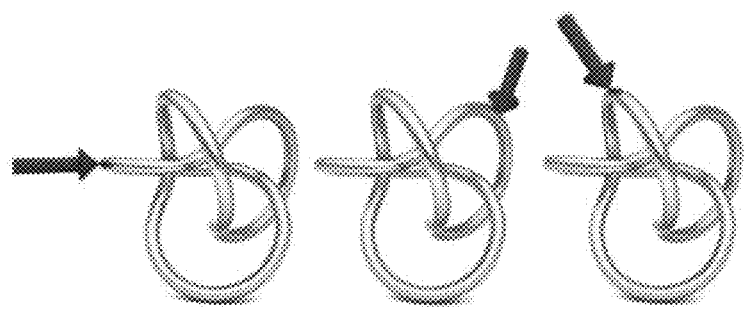
FIG. 19 illustrates a finite element mesh corresponding to a metal wire model.
Figure 19:
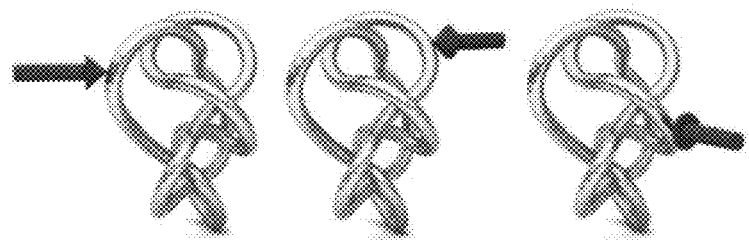

Application III: Nonlinear Sound Synthesis. Lastly, fast deformable precomputation also allows a quick forelook for sound synthesis. FIG. 19 illustrates a finite element mesh corresponding to a metal wire model. Arrows indicate the locations and directions of external forces. The mesh consists of 76,863 elements, and its nonlinear vibrations are simulated using 120 nonlinear inertia modes with the St. Venant-Kirchhoff material model. An example precomputation time for FIG. 19 may take around 48 seconds with 680 training poses and 342 cubature elements. The fast precomputation enables us to quickly update the reduced model whenever the user changes its geometry or material and thereby re-simulate the vibration for physics-based sound synthesis.

8 CONCLUSION

We present a comprehensive solution to accelerate the precomputation of nonlinear elastic deformable models based on Krylov iteration. We optimize the three performance bottlenecks along the traditional precomputation pipeline: the mode construction and its regularization, the cubature training and the generation of the training poses. Together with the devised Jacobian-free Newton-PCG solver, expensive precomputation is now made interactive or nearly interactive while the online simulation remains in real-time.

Error Analysis of the Sparse Inner Product

Eq. (6) is essentially an open-type Newton-Cotes formula, wherein the midpoint rule with a constant-value interpolating function is used. Eq. (6) corresponds to the open-type formula because we do not use values of target function at end points of an interval. Instead, the value at the midpoint is used.

FIG. 20 an example of 1D open-type Newton-Cotes integration with midpoint rule. In an illustrative 1D case shown in FIG. 20, the error of the numerical integration can be analytically expressed based on Lagrange Interpolation Theorem:

$$e = \int_a^b f(x)dx - Hf\left(\frac{H}{2}\right) \qquad \text{Equation 11}$$
$$= \frac{H^3}{24} f^{(2)}(v) + \frac{H^5}{1920} f^{(4)}(v) + \ldots,$$

where H=b−a is the size of the integration interval. $f^{(k)}$ denotes the k-th order derivative function of $f(x)$. v is some value between [a, b]. It is noteworthy that Eq. (11) gives the approximation error of adopting sparse inner product with respect to Eq. (5), the inner product between two vector-valued functions, while our real approximating target is the full-size mass inner products. Therefore, the numerical error induced by adopting the sparse inner product is bounded by $O((H-H_e)^3)$, where $H_e$ is the maximum size of the element on the mesh.

---

Algorithm 2 Reduced mass MGS

1: for each mode vector $u_i \in U$, i = 1...r do
2:     $u_i \leftarrow \frac{u_i}{\sqrt{(u_i, u_i)}}$
3: end for
4: $v_0 \leftarrow u_0$; $U^* \leftarrow [v_0]$     ▸ $U^*$ hosts the reglarized modes
5: for i = 2 : r do
6:     $v_i \leftarrow u_i$; l ← 1.0
7:     for j = 1 : i −1 do
8:        $\alpha \leftarrow \frac{(v_i, v_j)_S}{1}$     ▸ α is the sparse cosine
9:        if $|\alpha| < \alpha_T$ them
10:        $v_i \leftarrow v_i - \alpha l v_j$
11:        end if
12:        if $1 - \alpha^2 < 0.01$ then
13:          $v_i \leftarrow \frac{v_i}{\sqrt{(v_i, v_i)}}$; l ← 1.0     ▸ re normalize $v_i$
14:        else
15:          $l \leftarrow \sqrt{1 - \alpha^2} l$     ▸ incremental norm evaluation
16:        end if
17:     end for
18:     $U^* \leftarrow [U^* | \frac{v_i}{l}]$
19: end for

---

Implementation Details of rMGS with Subtraction Reduction

The pseudo-code outlining the proposed rMGS is given in Algorithm 2. It can be seen that rMGS needs to update the sparse-norm of $v_i$ (i.e., variable l in the pseudo-code) immediately, after a projection-subtraction is executed in order to evaluate α for the next loop. This subroutine sits in the innermost loop of rMGS and can be sped up by updating its sparse norm incrementally:

$$\|vi - \langle vi, vj \rangle vj\|s = \sqrt{(\langle v_i - \langle v_i, v_j \rangle_s v_j \rangle, (v_i - \langle v_i, v_j \rangle_s v_j))}$$
$$= \sqrt{\langle v_i, v_j \rangle_s + \langle v_i, v_j \rangle_s^2 - 2\langle v_i, v_j \rangle_s^2}$$
$$= \sqrt{1 - \alpha^2} \, l.$$

This equation (line 15 of Algorithm 2) however, could accumulate roundoff error and lead to negative square rooting when $\alpha$ goes large and l gets smaller. To maintain the numerical stability, the values of $1-\alpha^2$ and l are regularly checked (line 12 of Algorithm 2). If necessary, we fresh evaluate l directly using sparse inner product and re sparse-normalize $v_i$ (line 13 of Algorithm 2).

Jacobian-Free Newton-PCG Solver

The Newton's method is a common choice for online subspace integration. At each time step, Newton's method seeks for an incremental displacement $\Delta q$ as the residual minimizer iteratively. It typically requires the explicit formulation of the current tangent stiffness matrix, which is an $O(|\varepsilon|r^2)$ procedure. Besides, an accurate force gradient may not be available with MC scheme, recalling that Eq. (9) does not even preserve its symmetry. To tackle this limitation associated with MC training, we do not use any direct solvers (e.g., LU, Cholesky) to calculate $\Delta q$ within a Newton iteration. Instead, a preconditioned conjugate gradient (PCG) solver is adopted, which only needs the evaluation of the matrix-vector product. We approximate these matrix-vector products numerically instead of resorting to the analytical evaluation of the force Jacobian. Suppose that the implicit Newmark time integration is used. Each Newton iteration needs to solve a r-dimension linear system of $A\Delta q = -e$, where $$A = (\alpha_1 + \zeta\alpha_4)M_q + (1 + \xi\alpha_4)\frac{\partial f}{\partial q}\bigg|_{q_i},$$

$$e = M_q((\alpha_1 + \zeta\alpha_4)\delta q_i + (\zeta\alpha_5 - \alpha_2)\dot{q}_i + (\zeta\alpha_6 - \alpha_3)\ddot{q}_i) + \xi\frac{\partial f}{\partial q}\bigg|_{q_i}$$
$$(\alpha_4\delta q_i + \alpha_5\dot{q}_i + \alpha_6\ddot{q}_i) + f(q_i) - f_{ext}.$$

Here $\delta q_i = q_{i+1} - q_i$ is the displacement deviation at current time step. $\dot{q}_i$ and $\ddot{q}_i$ are the known reduced velocity and acceleration at the previous step. $\zeta$ and $\xi$ are damping coefficients. $f_{ext}$ is the reduced external force. $\alpha_1, \alpha_2, \ldots \alpha_6$ are constant coefficients computed as:

$$\alpha_1 = \frac{1}{\beta h^2}, \alpha_2 = \frac{1}{\beta h}, \alpha_3 = \frac{1-2\beta}{2\beta}, \alpha_4 = \frac{\gamma}{\beta h}, \alpha_5 = \frac{\beta - \gamma}{\gamma}, \alpha_6 = \frac{(2\beta - \gamma)h}{2\beta}$$

where $\beta = 1/2$, $\gamma = 1$ are two parameters of the Newmark integrator. h is the size of each time step.

Matrix-vector product between the system matrix A and a certain vector p in the PCG solver can be written as the summation of two items according to the formulation of A:

$$Ap = (\alpha_1 + \zeta\alpha_4)M_q p + (1 + \xi\alpha_4)\frac{\partial f}{\partial q}\bigg|_{q_i} p \quad \text{Equation 12}$$
$$= (\alpha_1 + \zeta\alpha_4)M_q p + (1 + \xi\alpha_4) \cdot \mathcal{D}f(q_i)[p].$$

The first term on the r.h.s can be directly evaluated as $M_q$ is a constant matrix. The second term is essentially the scaled directional derivative of the reduced internal force, where the notation of $\mathcal{D}\Pi(x)[u]$ stands for the directional derivative of a function $\Pi$ at x in the direction of u. Understanding this important fact allows us to use the numerical directional derivative to approximate the matrix-vector product associated with the reduced tangent stiffness matrix:

$$K_q(q_i)p = \frac{\partial f}{\partial q}\bigg|_{q_i} p = \mathcal{D}f(q_i)[p] \approx \frac{f(q_i + \varepsilon p) - f(q_i)}{\varepsilon} \quad \text{Equation 13}$$

The choice of $\varepsilon$ in Eq. (13) is not trivial: if $\varepsilon$ is too large, the derivative is poorly approximated and if it is too small the result of the finite difference is contaminated by floating-point roundoff error. We follow the choice used in NITSOL package:

$$\varepsilon = \frac{\sqrt{1 + \|q_i\|_2}}{\|p\|_2}\varepsilon_{machine}, \quad \text{Equation 14}$$

where $\varepsilon_{machine}$ is the machine epsilon. It is typically set as $10^{-6}$ for 64-bit double precision and is regarded as the most suitable number. The coefficient of $$\frac{\sqrt{1 + \|q_i\|_2}}{\|p\|_2}$$

makes sure that the final adopted $\varepsilon$ is not impaired by an over-scaled p.

Preconditioning.

The preconditioner plays a critical role for the PCG solver. Unfortunately, there does not yet exist a well-established theory finding the best preconditioner for every case. Most preconditioning methods such as Jacobi, Gauss-Seidel, or SOR preconditioning require the information of the system matrix A, which is not available in our case as the tangent stiffness matrix is unknown. Alternatively, we design the preconditioner P as the largest invariant portion of A:

$$P = (\alpha_1 + \zeta\alpha_4)M_q + (1 + \xi\alpha_4)K_q(0). \quad \text{Equation 15:}$$

We find that using the preconditioner defined in Eq. 15 is able to double the convergence rate. The initial guess of the PCG is set as $\delta q_i$ at the very beginning of each time step and as a zero vector for the rest Newton iterations following the logic that the current $\Delta q$ should be similar to the previous one at the first the Newton iteration, while it should quickly converge to a zero vector as Newton iteration moves forward.

Example Computing Device

Figure 21:
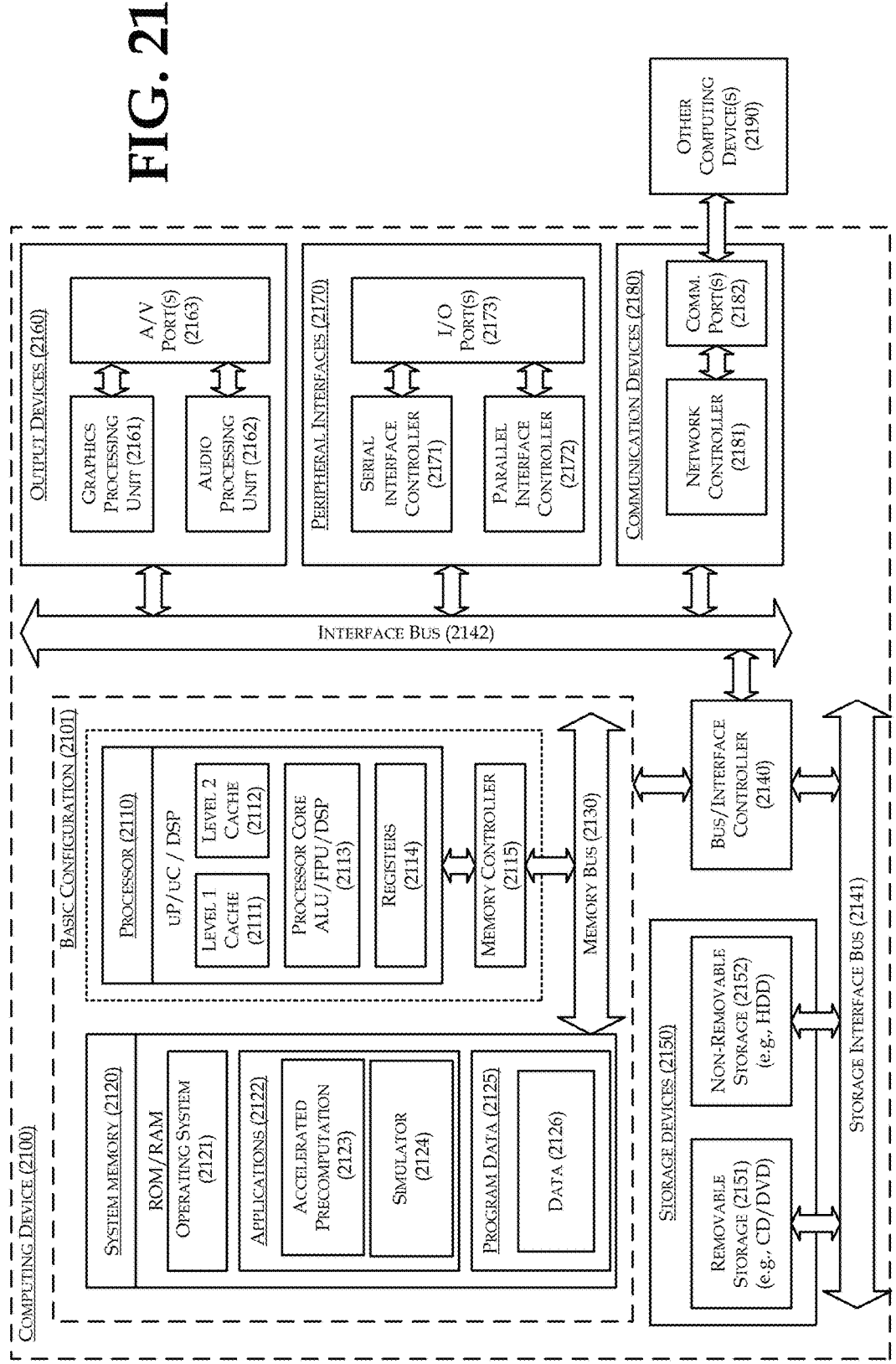
FIG. 21 illustrates an example computing device 2100 configured with an accelerated precomputation application to implement the various techniques disclosed herein.

FIG. 21 illustrates an example computing device 2100 configured with an accelerated precomputation application to implement the various techniques disclosed herein. In a very basic configuration 2101, computing device 2100 may include one or more processors 2110 and a system memory 2120. A memory bus 2130 may be used for communicating between processor 2110 and system memory 2120.

Depending on the desired configuration, processor 2110 may be of any type including but not limited to a microprocessor (μP), a microcontroller (μC), a digital signal processor (DSP), or any combination thereof. Processor 2110 may include one or more levels of caching, such as a level one cache 2111 and a level two cache 2112, a processor core 2113, and registers 2114. Processor core 2113 may include an arithmetic logic unit (ALU), a floating point unit (FPU), a digital signal processing core (DSP Core), or any combination thereof. A memory controller 2115 may also be used with processor 2110, or in some implementations memory controller 2115 may be an internal part of processor 2110.

Depending on the desired configuration, system memory 2120 may be of any type including but not limited to volatile memory (such as RAM), non-volatile memory (such as ROM, flash memory, etc.), or any combination thereof. System memory 2120 typically includes an operating system 2121, one or more applications 2122, and program data 2125. In some embodiments, operating system 2121 may comprise a virtual machine that is managed by a Virtual Machine Manager (VMM). Applications 2122 may include an accelerated precomputation application 2123 which may implement any or all of the various precomputation techniques disclosed herein, and optionally a simulator application 2124 which may perform simulations using reduced deformable models generated by the precomputation application 2123. Program data 2125 may include data 2126 which may include any or all of the various data inputs and outputs described in connection with the disclosed precomputation techniques. Computing device 2100 may also connect with other computing devices 2190 to access cloud or remote data base storage.

Computing device 2100 may have additional features or functionality, and additional interfaces to facilitate communications between the basic configuration 2101 and any required devices and interfaces. For example, a bus/interface controller 2140 may be used to facilitate communications between the basic configuration 2101 and one or more data storage devices 2150 via a storage interface bus 2141. The data storage devices 2150 may be removable storage devices 2151, non-removable storage devices 2152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 2111, level 2 cache 2112, system memory 2120, removable storage 2151, and non-removable storage devices 2152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 2100. Any such computer storage media may be part of device 2100.

Computing device 2100 may also include an interface bus 2142 for facilitating communication from various interface devices (e.g., output interfaces, peripheral interfaces, and communication interfaces) to the basic configuration 2101 via the bus/interface controller 2140. Example output devices 2160 include a graphics processing unit 2161 and an audio processing unit 2162, which may be configured to communicate to various external devices such as a display or speakers via one or more A/V ports 2163. Example peripheral interfaces 2170 may include a serial interface controller 2171 or a parallel interface controller 2172, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 2173. Other conventional I/O devices may be connected as well such as a mouse, keyboard, and so forth. An example communications device 2180 includes a network controller 2181, which may be arranged to facilitate communications with one or more other computing devices 2190 via one or more communication ports 2182.

In some embodiments, computing device 2100 may be implemented as a business or personal use computer including both laptop computer and non-laptop computer configurations. In some embodiments, computing device 2100 may be implemented as one or more servers, e.g., servers in a data center or servers in an animation studio.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method to precompute a reduced deformable model for an object represented by an input mesh, comprising:
    applying a Krylov subspace iteration to construct a series of inertia modes for the input mesh;
    condensing the inertia modes into a mode matrix;
    sampling a set of cubature points from the input mesh, and calculating cubature weights for the set of cubature points, for each of the linear inertia modes in the mode matrix;
    generating a training dataset by iteratively adding training samples to the training dataset until a training error metric converges, wherein each training sample is generated from an inertia mode in the mode matrix and corresponding cubature weights; and
    generating the reduced deformable model, wherein the reduced deformable model includes inertia modes in the training dataset and corresponding cubature weights.

2. The method of claim 1, wherein the set of cubature points are uniformly sampled from the input mesh.

3. The method of claim 1, wherein the series of inertia modes comprises linear inertia modes and nonlinear inertia modes, and further comprising computing asymptotic inertia derivatives for the input mesh in order to generate the nonlinear inertia modes.

4. The method of claim 1, further comprising using the reduced deformable model in one or more online simulations.

5. The method of claim 1, wherein iteratively adding training samples to the training dataset comprises adding more than one inertia mode at each iteration.

6. The method of claim 1, further comprising applying a Gram-Schmidt orthogonalization scheme to regularize the constructed series of inertia modes.

7. The method of claim 1, wherein a random projection method is used to condense the inertia modes in the mode matrix.

8. A computing device equipped to precompute reduced deformable models, comprising:
    a processor;
    a memory; and
    a precomputation application stored in the memory and executable by the processor, wherein the precomputation application is adapted to precompute a reduced deformable model for an object represented by an input mesh by causing the processor to:
    apply a Krylov subspace iteration to construct a series of inertia modes for the input mesh;
    condense the inertia modes into a mode matrix;
    sample a set of cubature points from the input mesh, and calculating cubature weights for the set of cubature points, for each of the linear inertia modes in the mode matrix;
    generate a training dataset by iteratively adding training samples to the training dataset until a training error metric converges, wherein each training sample is generated from an inertia mode in the mode matrix and corresponding cubature weights; and
    generate the reduced deformable model, wherein the reduced deformable model includes inertia modes in the training dataset and corresponding cubature weights.

9. The computing device of claim 8, wherein the set of cubature points are uniformly sampled from the input mesh.

10. The computing device of claim 8, wherein the series of inertia modes comprises linear inertia modes and nonlinear inertia modes, and wherein the precomputation application causes the processor to compute asymptotic inertia derivatives for the input mesh in order to generate the nonlinear inertia modes.

11. The computing device of claim 8, further comprising a simulator application which causes the processor to use the reduced deformable model in one or more online simulations.

12. The computing device of claim 8, wherein iteratively adding training samples to the training dataset comprises adding more than one inertia mode at each iteration.

13. The computing device of claim 8, wherein the precomputation application causes the processor to apply a Gram-Schmidt orthogonalization scheme to regularize the constructed series of inertia modes.

14. The computing device of claim 8, wherein a random projection method is used to condense the inertia modes in the mode matrix.

* * * * *